United States Patent
Oohashi et al.

(10) Patent No.: US 7,362,887 B2
(45) Date of Patent: Apr. 22, 2008

(54) FACE IDENTIFICATION APPARATUS, FACE IDENTIFICATION METHOD, AND FACE IDENTIFICATION PROGRAM

(75) Inventors: Takahiro Oohashi, Saitama (JP); Naoaki Sumida, Saitama (JP); Nobuo Higaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 10/965,919

(22) Filed: Oct. 18, 2004

(65) Prior Publication Data

US 2005/0180611 A1    Aug. 18, 2005

(30) Foreign Application Priority Data

Feb. 13, 2004  (JP) .............................. 2004-036126

(51) Int. Cl.
  *G06K 9/00*  (2006.01)
(52) U.S. Cl. ...................... 382/118; 382/117; 382/168; 382/173; 351/204; 396/18
(58) Field of Classification Search ............... 382/117, 382/118, 168, 171, 172, 173, 190, 199, 203, 382/266, 274, 289, 296; 351/210, 206, 221, 351/204; 396/18; 348/78; 345/8
See application file for complete search history.

(56) References Cited

U.S. PATENT DOCUMENTS

| | | | | |
|---|---|---|---|---|
| 5,008,946 A | * | 4/1991 | Ando ........................... | 382/104 |
| 5,867,588 A | * | 2/1999 | Marquardt ................... | 382/118 |
| 5,905,563 A | * | 5/1999 | Yamamoto ................... | 351/210 |
| 5,912,721 A | * | 6/1999 | Yamaguchi et al. ......... | 351/210 |
| 6,307,954 B1 | * | 10/2001 | Suzaki ........................ | 382/117 |
| 6,381,346 B1 | * | 4/2002 | Eraslan ....................... | 382/118 |
| 6,508,553 B2 | * | 1/2003 | Gao et al. ................... | 351/227 |
| 6,879,709 B2 | * | 4/2005 | Tian et al. .................. | 382/118 |
| 7,280,678 B2 | * | 10/2007 | Haven et al. ................ | 382/117 |

FOREIGN PATENT DOCUMENTS

| | | |
|---|---|---|
| DE | 19509689 | 9/1995 |
| DE | 19955714 | 5/2000 |
| EP | 0552770 | 7/1993 |
| EP | 0984386 | 3/2000 |
| JP | 09-251534 | 9/1997 |
| JP | 10-232934 | 9/1998 |
| JP | 11-015979 | 1/1999 |

\* cited by examiner

*Primary Examiner*—Sheela Chawan
(74) *Attorney, Agent, or Firm*—Squire, Sanders & Dempsey LLP

(57) ABSTRACT

A face identification apparatus for identifying a face is designed to have a face region expectation measure for expecting his/her face region within the image; a pupil-candidate-point detection measure for converting the face region to an image of a standard size, making it a standard image, and detecting his/her right/left pupil candidate points out of a search region within the standard image; a reference data generation measure for generating a normalization image from the standard image with making it a standard a distance of the right/left pupil candidate points and making reference data for evaluating advisability of the face region from the normalization image; and a face region evaluation measure for obtaining a degree of approximation between the reference data and standard data prepared in advance and evaluating the advisability of the face region.

9 Claims, 16 Drawing Sheets

Distance Image D1

Difference Image D2

Edge Image D3

Flesh-Color Region R1,R2

Set of Object Distance

Generation of Object Distance Image D4

FIG. 5A
Set of Object Region T (1)
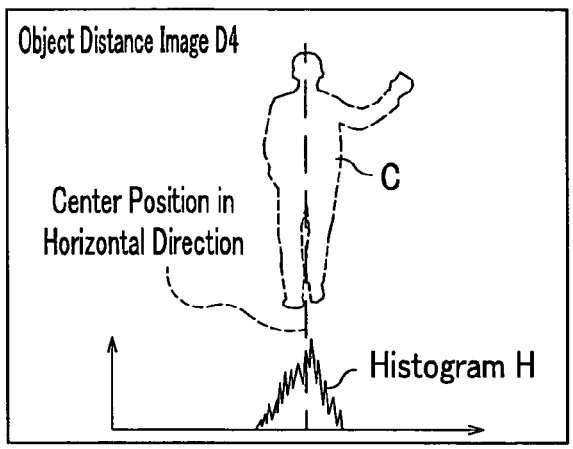
FIG. 5B
Set of Object Region T (2)
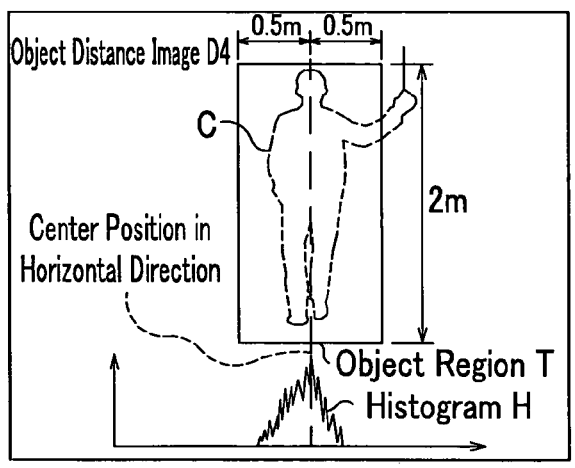
FIG. 5C
Extraction of Profile O
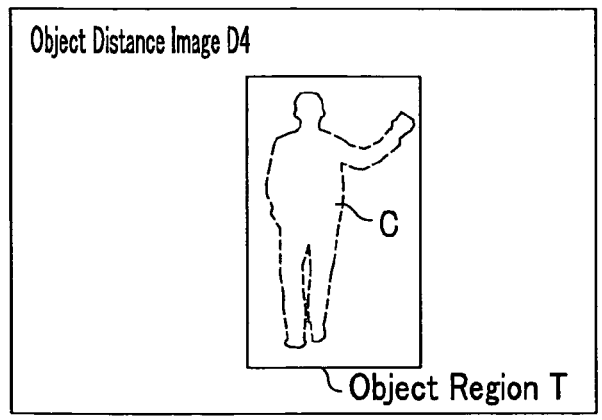
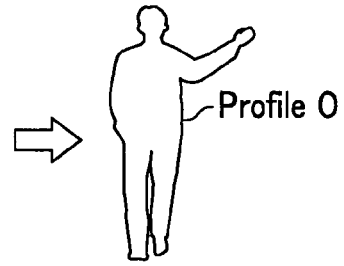

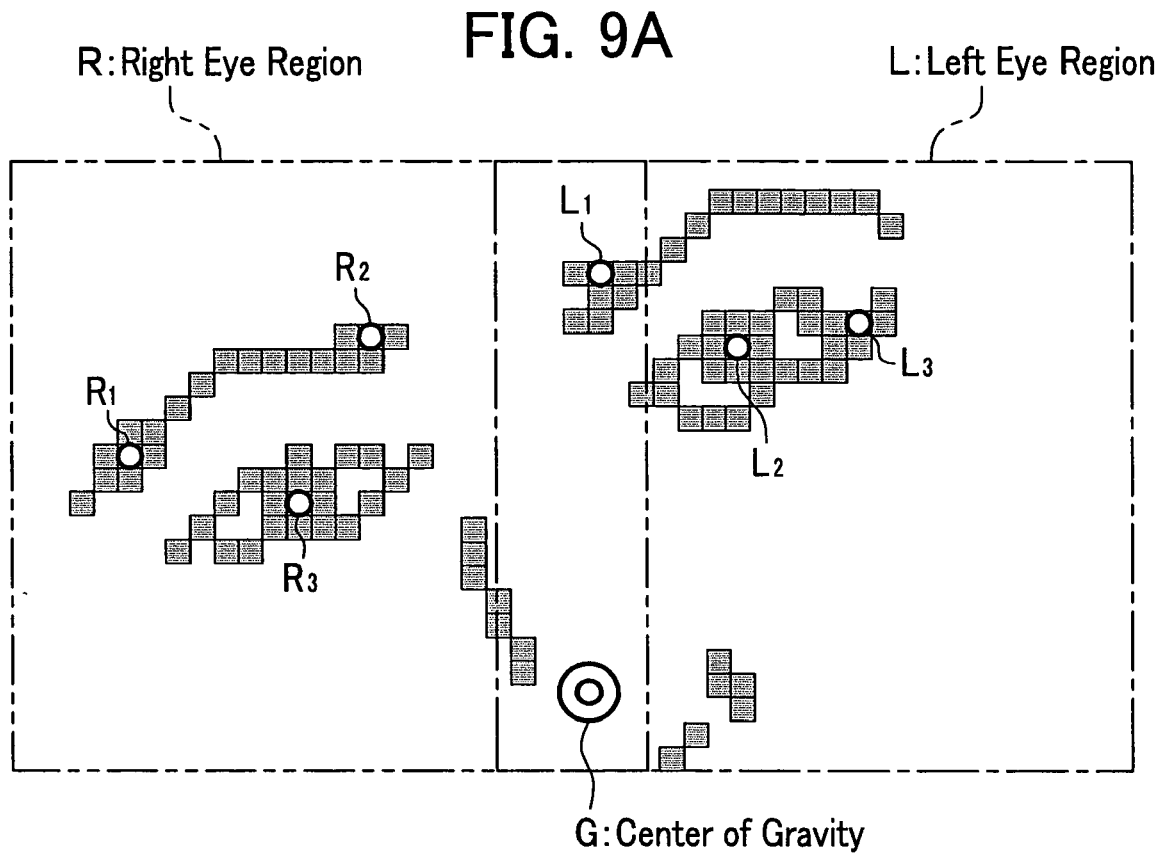

G: Center of Gravity

G: Center of Gravity

DFES Figure Within Left Eye Region

FACE IDENTIFICATION APPARATUS, FACE IDENTIFICATION METHOD, AND FACE IDENTIFICATION PROGRAM

BACKGROUND OF THE INVENTION

1. Field of the Invention

The present invention relates to a face identification apparatus, a face identification method, and a face identification program for identifying a face of an object person of an image object; and particularly, to the face identification apparatus, the face identification method, and the face identification program for judging whether or not a facial region (face region) expected in an image (taken image), which is obtained by imaging the object person, is suitable, and identifying the face of the object person, based on the facial region (face region) judged suitable.

2. Description of the Related Art

These years there are proposed many methods and apparatuses thereof for identifying an object person from an image where the object person is taken by a video camera (hereinafter simply referred to as 'camera') such as a CCD (Charge Coupled Device) camera.

As conventional technologies of this kind, there are ones as follows: a patent document 1, Japanese Patent Laid-Open Publication Hei No. 09-251534 (paragraph 0021); a patent document 2, Japanese Patent Laid-Open Publication Hei No. 10-232934 (paragraph 0023 and FIG. 1); and a patent document 3, Japanese Patent Laid-Open Publication Hei No. 11-015979 (paragraphs 0015 to 0031 and FIG. 2).

Inventions described in these patent documents extract a facial region (face region) from an image obtained by imaging an object person, dispense normalization processing to the face region, making features such as eyes and a mouth included in the extracted face region, and thus make a normalized face regional image (normalization face image). And the inventions compare/collate the normalization face image with a dictionary image prepared in advance and recognize/identify the object person.

The inventions described in the patent documents 1 and 2 perform the extraction of the face region by calculating a correlation value while moving a standard face image (template) across a whole screen of the image and regarding the highest region of the correlation value as the face region.

In addition, the invention described in the patent document 3 performs the extraction of the face region by searching a flesh-color region and a dark region in the image and regarding the flesh-color region, where the dark region is included at a constant ratio within the flesh-color region, as the face region.

But because when an object person is moving or an imaging of the object person is performed while moving, a position relationship between a light source and the object person changes, in some case a shade enters in the face of the object person within the image and the extraction of the face region is not adequately performed, receiving an influence of the shade.

In such the case the inventions described in the patent documents recognize/identify the object person without judging whether or not the extracted face region is suitable for the recognition/identification of the object person. Accordingly, when an inadequate face region is extracted, the inventions result in recognizing/identifying the object person, based on the inadequate face region, and there occurs a problem that these cannot accurately recognize/identify the object person.

Consequently, there is a strong request for a method and an apparatus that do not generate such the problem.

SUMMARY OF THE INVENTION

The present invention relates to a face identification apparatus comprising an identification measure for identifying a face of an object person, based on an image (taken image) of the object person taken by a camera.

The face identification apparatus comprises: a face region expectation measure for expecting a face region of the object person in the image, based on distance information representing a distance from the camera to the object person, and profile information and flesh-color region information of the object person generated from the image; a pupil-candidate-point detection measure for generating a standard image with converting the face region to an image of a standard size, based on the distance information, setting a search region with making it a standard a center of gravity of the face region in the standard image, searching a circular edge for each pixel included in the search region, and detecting a right pupil candidate point and left pupil candidate point of the object person out of pixels of a predetermined circular edge; a reference data generation measure for rotating the standard image so that a line segment connecting the right pupil candidate point and the left pupil candidate point becomes horizontal within the standard image, then generating a normalization image with making it a standard a distance of the right pupil candidate point and the left pupil candidate point, and making reference data for evaluating advisability of the face region from the normalization image; and a face region evaluation measure for obtaining a degree of approximation between the reference data and standard data prepared in advance and evaluating the advisability of the face region, based on the obtained degree of approximation.

The face identification apparatus is preferable to detect at least not less than each two of the right pupil candidate points and the left pupil candidate points by the pupil candidate point detection measure and to make the reference data for all combinations between the right pupil candidate points and the left pupil candidate points that are detected.

Furthermore, in the face identification apparatus, if the face region is judged inadequate by the face region evaluation measure, the evaluation measure is preferable to request the face region expectation measure so as to again expect the face region of the object person; if the face region is judged adequate by the face region evaluation measure, the evaluation measure is preferable to make it a standard the right pupil candidate point and the left pupil candidate point detected by the pupil candidate point detection measure and to compensate the face region.

In addition, the present invention is a method for identifying a face of an object person, based on an image of the object person taken by a camera, and relates to the face identification method comprising: a face region expectation step of expecting a face region of the object person in the image, based on distance information representing a distance from the camera to the object person, and profile information and flesh-color region information of the object person generated from the image; a pupil-candidate-point detection step of generating a standard image with converting the face region to an image of a standard size, based on the distance information, setting a search region with making it a standard a center of gravity of the face region in the standard image, searching a circular edge for each pixel included in the search region, and detecting a right pupil candidate point and left pupil candidate point of the object person out of pixels of a predetermined circular edge; a reference data generation step of rotating the standard image so that a line segment connecting the right pupil candidate point and the left pupil candidate point becomes horizontal within the standard image, then generating a normalization image with making it a standard a distance of the right pupil candidate point and the left pupil candidate point, and making reference data for evaluating advisability of the face region from the normalization image; a face region evaluation step of obtaining a degree of approximation between the reference data and standard data prepared in advance and evaluating the advisability of the face region, based on the obtained degree of approximation; and a face data making step of making face data of the object person from the normalization image if the face region is judged adequate in the face region evaluation step; and a face identification step of comparing/collating the face data made in the face data making step with face data registered in a memory measure.

Furthermore, in order to identify a face of an object person, based on an image of the object person taken by a camera, the present invention relates to a face identification program where a computer is made to function as: a face region expectation measure for expecting a face region of the object person in the image, based on distance information representing a distance from the camera to the object person, and profile information and flesh-color region information of the object person generated from the image; a pupil candidate-point detection measure for generating a standard image with converting the face region to an image of a standard size, based on the distance information, setting a search region with making it a standard a center of gravity of the face region in the standard image, searching a circular edge for each pixel included in the search region, and detecting a right pupil candidate point and left pupil candidate point of the object person out of pixels of a predetermined circular edge; a reference data generation measure for rotating the standard image so that a line segment connecting the right pupil candidate point and the left pupil candidate point becomes horizontal within the standard image, then generating a normalization image with making it a standard a distance of the right pupil candidate point and the left pupil candidate point, and making reference data for evaluating advisability of the face region from the normalization image; a face region evaluation measure for obtaining a degree of approximation between the reference data and standard data prepared in advance and evaluating the advisability of the face region, based on the obtained degree of approximation; and a face data making step of making face data of the object person from the normalization image if the face region is judged adequate in the face region evaluation step; and a face identification measure for comparing/collating the face data made in the face data making measure with face data registered in a memory measure.

BRIEF DESCRIPTION OF THE DRAWINGS

FIGS. 5A and 5C are drawings for illustrating methods of setting an object region T and extracting a profile O of an object person C from within the object region T.

FIG. 5B is a drawing illustrating method of setting a specific size at right/left of the specified center position as the object region T.

FIG. 9A is a drawing illustrating a right pupil candidate point and a left pupil candidate point searched at a right eye region and a left eye region; FIG. 9B is a drawing illustrating a combination set for the right pupil candidate point and the left pupil candidate point

DESCRIPTION OF THE PREFERRED EMBODIMENTS

Here will be described preferred embodiments of the present invention, referring to drawings. Here, at first, will be described a configuration of a face identification system A comprising a face identification apparatus 4 related to the present invention, referring to FIGS. 1 to 5, and then an operation of the face identification system A, referring to FIGS. 14 and 15.

Configuration of Face Identification System A

Firstly will be described a general configuration of the face identification system A comprising the face identification apparatus 4 related to the present invention, referring to FIG. 1.

Figure 1:
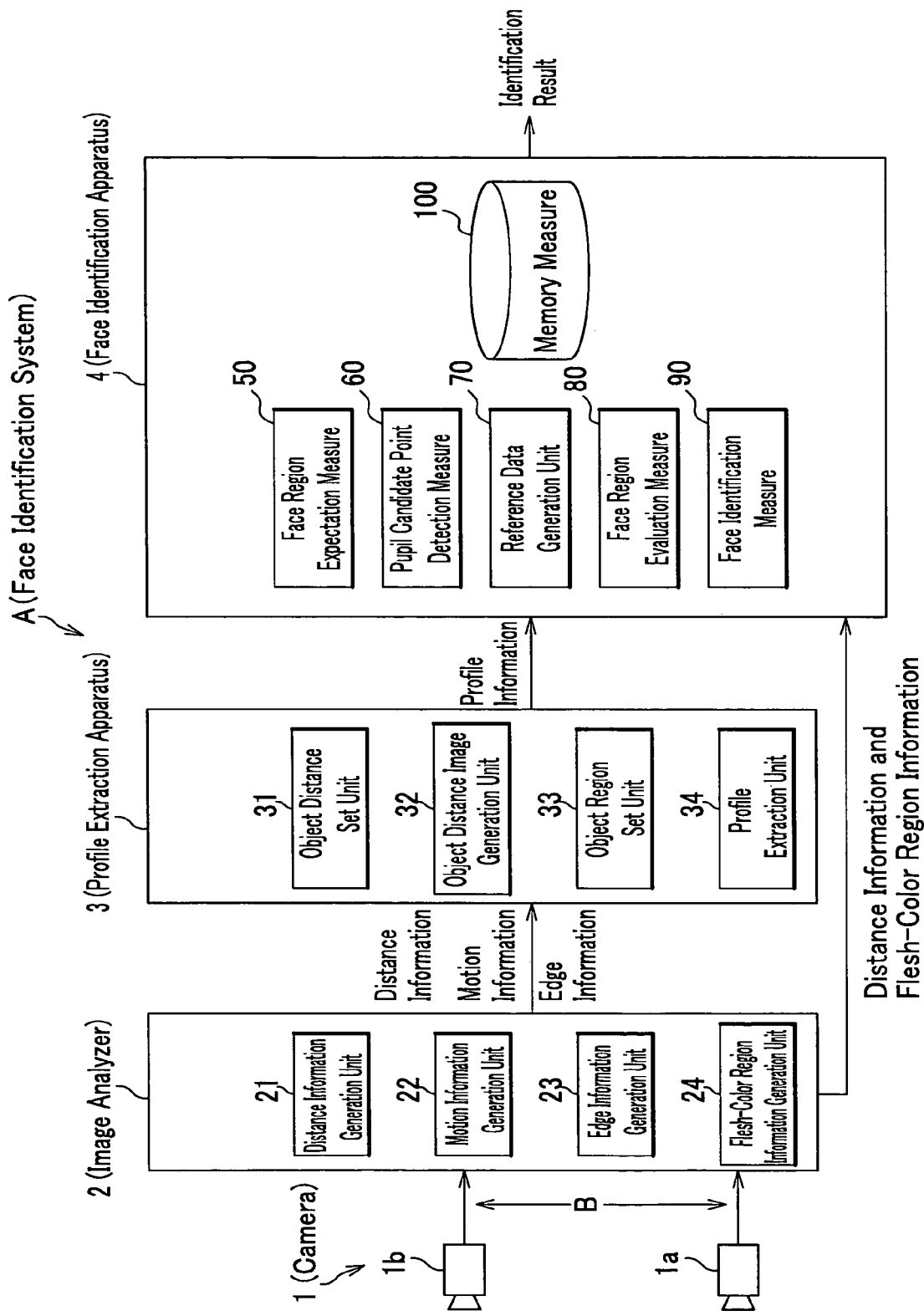
FIG. 1 is a block diagram showing a general configuration of a face identification system A.

As shown in FIG. 1, the face identification system A comprises two cameras 1 (1a, 1b) for taking an image of an object person (not shown); an image analyzer 2 for analyzing the image (taken image) taken by the cameras 1 and generating various information; a profile extraction apparatus 3 for extracting a profile of the object person, based on the various information generated by the image analyzer 2; and the face identification apparatus 4 for identifying the face of the object person, based on the various information generated by the image analyzer 2 and the profile (profile information) of the object person extracted by the profile extraction apparatus 3. Here will be described the cameras 1, the image analyzer 2, the profile extraction apparatus 3, and the face identification apparatus 4 in turn.

Cameras 1

The cameras 1 (1a, 1b) are a color CCD camera, and the right camera 1a and the left camera 1b are provided side by side, separated by a distance B. Here the right camera 1a is made a reference one. Images (taken images) taken by the right camera 1a and the left camera 1b are memorized in a frame grabber not shown per frame and then are synchronously input to the image analyzer 2.

Meanwhile, the right camera 1a and the left camera 1b perform a calibration and a rectification or the images (taken images) by a compensation instrument not shown and input them to the image analyzer 2 after the compensation of the images. In addition, the cameras 1 are a movable camera, and when a background within the images changes, the cameras 1 compensate them, based on camera movement amounts such as a pan and a tilt per image.

Image Analyzer 2

The image analyzer 2 is an apparatus for analyzing images (taken images) input from the cameras 1a, 1b and generating 'distance information,' 'motion information,' 'edge information,' and 'flesh-color region information.'

Figure 2:
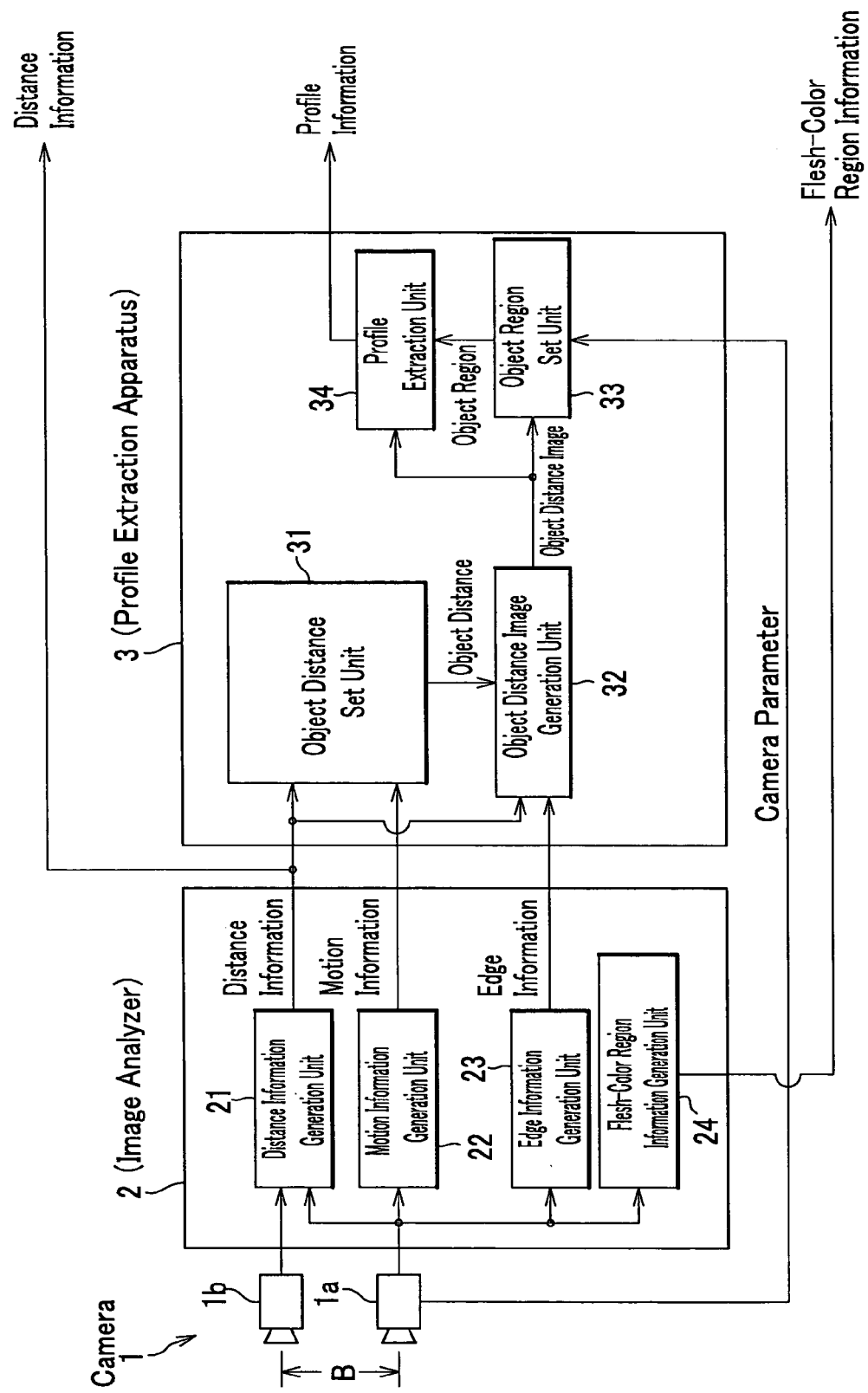
FIG. 2 is a block diagram showing a configuration of an image analyzer 2 and a profile extraction apparatus comprised in the face identification system A shown in FIG. 1.

As shown in FIG. 2, the image analyzer 2 comprises a distance information generation unit 21 for generating the 'distance information,' a motion information generation unit 22 for generating the 'motion information,' an edge information generation unit 23 for generating the 'edge information,' and a flesh-color region information 24 for generating the 'flesh-color region information.'

Distance Information Generation Unit 21

The distance information generation unit 21 detects a distance from the cameras 1 for each pixel, based on a parallax of two pieces of images taken by the cameras 1a, 1b at a same time. To be more precise, the unit 21 obtains the parallax from a first image taken by the camera 1a of the reference camera and a second image taken by the camera 1b, using a block correlation method; and then obtains the distance from the cameras 1 to an object imaged into each pixel according to the parallax, using a triangular method. And the unit 21 makes the obtained distance correspond to each pixel of the first image and generates a distance image D1 (see FIG. 3A) where the distance is expressed in a pixel value. The distance image D1 becomes the distance information. In an example of FIG. 3A an object person C exists at a same distance.

Meanwhile, the block correlation method is a method for detecting the parallax by comparing a same block (for example, 16×16 pixels) of a specific size between the first image and the second image, and investigating by how many pixels an object within the block is displaced between the first image and the second image.

Motion Information Generation Unit 22

Figure 3A:
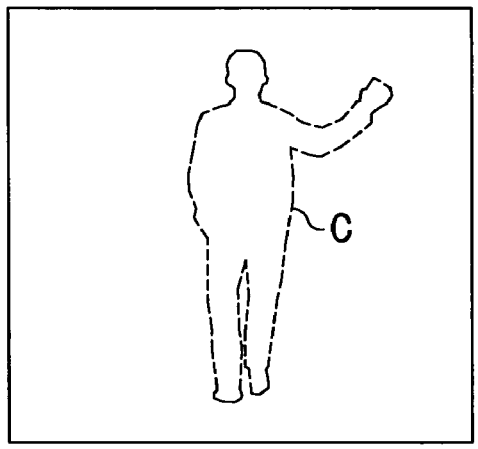
FIG. 3A is a drawing showing a distance image D1.
Figure 3B:
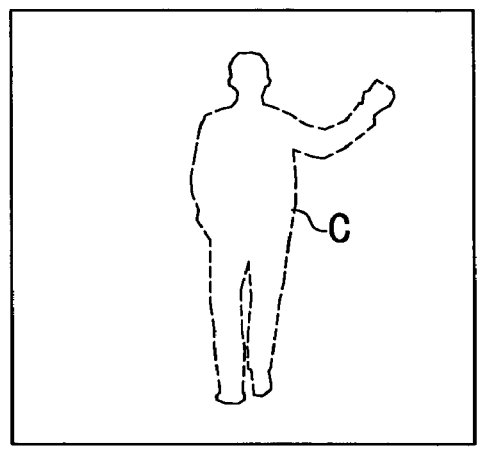
FIG. 3B is a drawing showing a difference image D2.

The motion information generation unit 22 detects a motion of the object person C, based on a difference between an 'image (t)' at time t and an 'image (t+1)' at time t+1 taken by the camera 1a of the reference camera. To be more precise, the unit 22 takes the difference between the image (t) and the image (t+1) and investigates a displacement of each pixel. And the unit 22 obtains a displacement vector, based on the investigated displacement, and generates a difference image D2 (see FIG. 3B) where the obtained displacement vector is expressed in a pixel value. The difference image D2 becomes the motion information. In an example of FIG. 3B is detected a motion at a left arm of the object person C.

Edge Information Generation Unit 23

The edge information generation unit 23 generates an edge image that extracts an edge existing within an image, based on shading or color information of each pixel in an image (taken image) taken by the camera 1a of the reference camera. To be more precise, the unit 23 detects a portion where a luminance largely changes as an edge, based on the luminance of each pixel in the image and generates an edge image D3 (see FIG. 3C) consisting of nothing but the edge. The edge image D3 becomes the edge information.

The edge detection is performed, for example, by multiplying Sobel operators for each pixel and detecting a line segment with a predetermined difference from a neighboring line segment as an edge (lateral edge or longitudinal edge) for a row or a column unit. Meanwhile, the Sobel operators are a coefficient matrix having a weight coefficient for a pixel of a vicinity region of a certain pixel.

Flesh-Color Region Information Generation Unit 24

The flesh-color region information generation unit 24 extracts a flesh-color region of an object person existing within an image from the image (taken image) taken by the camera 1a of the reference camera. To be more precise, the unit 24 converts RGB values of all pixels in the image to an HLS (Hyper Logic Space) space consisting of hue, brightness, and chroma; and extracts pixels, where the hue, brightness, and chroma are within ranges of thresholds set in advance, as the flesh-color region (see FIG. 3D). In an example of FIG. 3D the face of the object person C is extracted as a flesh-color region R1, and a hand tip is extracted as a flesh-color region R2. The flesh-color regions R1, R2 become the flesh-color region information.

The 'distance information (distance image D1),' the 'motion information (difference image D2),' and the 'edge information (edge image D3)' are input to the profile extraction apparatus 3. In addition, the 'distance information (distance image D1)' and the 'flesh-color region information (flesh-color regions R1, R2)' are input to the face identification apparatus 4.

Face Profile Extraction Apparatus 3

The face profile extraction apparatus 3 is an apparatus fro extracting a profile of the object person C, based on the 'distance information (distance image D1),' the 'motion information (difference image D2),' and the 'edge information (edge image D3)' generated by the image analyzer 2 (see FIG. 1).

As shown in FIG. 2, the face profile extraction apparatus 3 comprises: an object distance set unit 31 for setting an 'object distance' that is a distance, where the object person C exists; an object distance image generation unit 32 for generating an 'object distance image' based on the 'object distance;' an object region set unit 33 for setting an 'object region' in 'object distance image;' and a profile extraction unit 34 for extracting an 'object person profile' from within the 'object region.'

Object Distance Set Unit 31

The object distance set unit 31 sets the 'object distance' that is the distance where the object person C exists, based on the distance image D1 (see FIG. 3A) generated by the image analyzer 2 and the difference image D2 (see FIG. 3B) generated by the motion information generation unit 22. To be more precise, the unit 31 makes pixels, which have a same pixel value, a group (pixel group) and sums up the pixel value of the pixel group in the difference image D2. And the unit 31 regards that a moving object with a most motion amount, that is, the object person C, exists at a region where a summation value of the pixel values is larger than a predetermined value and which is located at a distance nearest the cameras 1; and makes the distance the object distance (see FIG. 4A). In an example of FIG. 4A the object distance is set 2.2 m. The object distance set by the object distance set unit 31 is input to the object distance image generation unit 32.

Object Distance Image Generation Unit 32

Figure 3C:
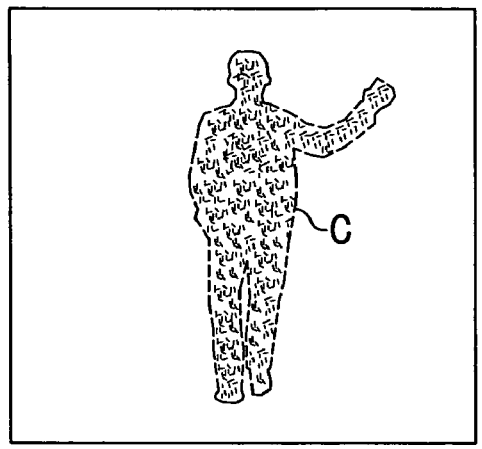
FIG. 3C is a drawing showing an edge image D3.
Figure 3D:
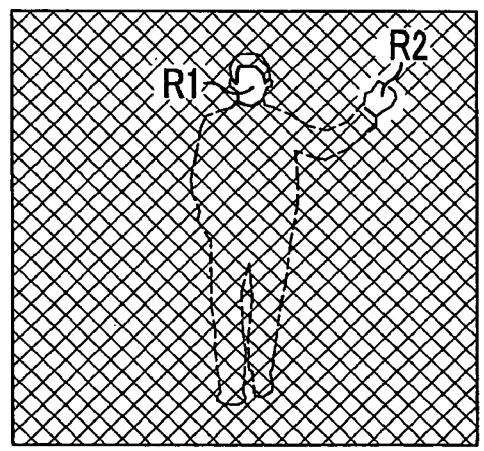
FIG. 3D is a drawing showing flesh-color regions R1, R2.
Figure 4A:
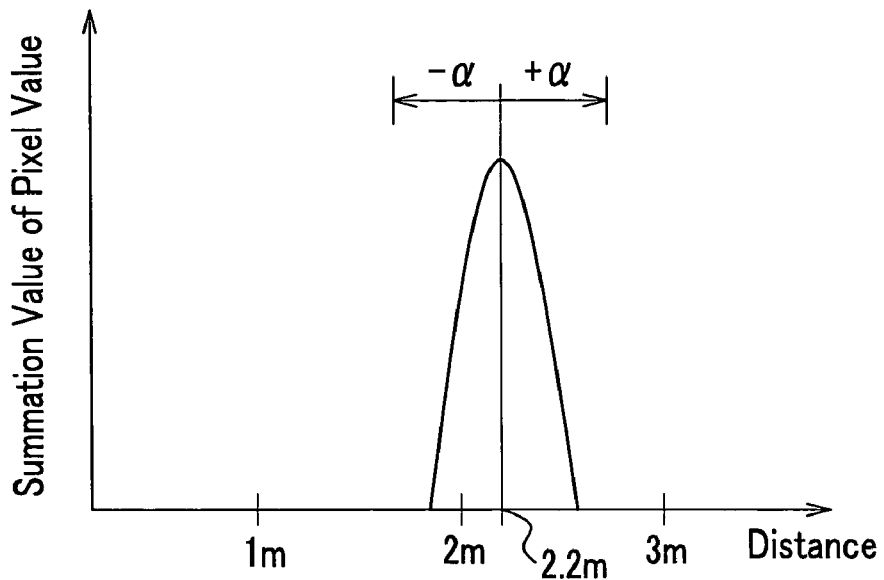
FIGS. 4A and 4B are drawings for illustrating a method of setting an object distance.
Figure 4B:
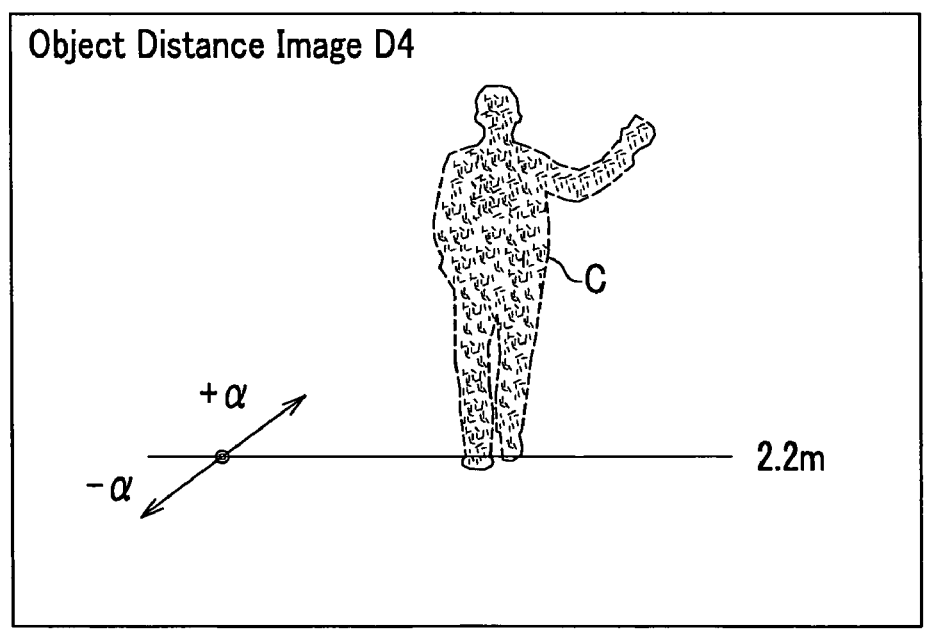

The object distance image generation unit 32 refers to the distance image D1 (see FIG. 3A) generated by the image analyzer 2 and generates an 'object distance image D4' where pixels corresponding to ones existing between an object distance ±αcm set by the object distance set unit 31 are extracted from the edge image D3 (see FIG. 3C). To be more precise, the unit 32 obtains the pixels corresponding to the object distance ±αcm input from the object distance set unit 31 in the distance image D1. And the unit 32 extracts nothing but the obtained pixels from the edge image D3 (see FIG. 3C) generated by the edge information generation unit 23 and generates the object distance image D4 (see FIG. 4B). Meanwhile, in an example of FIG. 3C the α is set 0.5 m. The object distance image D4 generated by the object distance image generation unit 32 is input to the object region set unit 33 and the profile extraction unit 34.

Object Region Set Unit 33

The object region set unit 33 sets an 'object region T' in the within object distance image D4 generated by the object distance image generation unit 32. To be more precise, the unit 33 generates a histogram H where pixel values in a vertical direction of the object distance image D4 are summed up and specifies a position, where a frequency in the histogram H becomes maximum, as a center position in a horizontal direction of the object person C (see FIG. 5A). And the unit 33 sets a range of a specific size (for example, 0.5 m) at right/left of the specified center position as the object region T (see FIG. 5B). Meanwhile, a range in the vertical direction of the object region T is set a specific size (for example, 2 m). In addition, in setting the object region T the unit 33 refers to camera parameters such as a tilt angle and a height of the cameras 1 and compensates a set range of the object region T. The object region T set by the object region set unit 33 is input to the profile extraction unit 34.

Profile Extraction Unit 34

The profile extraction unit 34 extracts a profile of the object person C from within the object region T set by the object region set unit 33 in the object distance image D4 (see FIG. 4B) generated by the object distance image generation unit 32. To be more precise, the unit 34 extracts a profile O of the object person C, using a technique called Snakes (see FIG. 5C). Meanwhile, the Snakes is a technique for extracting a profile of an object by using a dynamic profile model consisting of a closed curve called Snake and shrinking/deforming the closed curve so as to minimize energy defined in advance. The profile O of the object person C extracted by the profile extraction unit 34 is input to the face identification apparatus 4 as the 'profile information' (see FIG. 1).

Face Identification Apparatus 4

The face identification apparatus 4 is an apparatus for expecting the region (face expectation region) where the face of the object person C is expected to exist from an image obtained by taking his/her image; judging where or not the face expectation region is suitably usable for his/her face identification; identifying him/her only if judged suitably usable; again expecting the face expectation region if judged not suitably usable; and the like, based on the profile information input from the profile extraction apparatus 3 and the flesh-color region information and the distance information input from the image analyzer 2.

As shown in FIGS. 1 to 6, the face identification apparatus 4 comprises a face region expectation 50, a pupil candidate point detection measure 60, a reference data generation measure 70, a face region evaluation measure 80, a face identification measure 90, and a memory measure 100.

In the memory measure 100 are registered a face database, a pupil database, and unique vectors of a face and pupils for prescribing a unique space generated, matching the face database and the pupil database, respectively.

In the face database are registered coefficients of a plurality of persons when individual faces are expressed in a linear summation of unique vectors.

In the pupil database are registered coefficients of a plurality of persons when individual pupils are expressed in a linear summation of unique vectors.

The face unique vector is one whose contribution ratio is higher out of unique vectors obtained by performing a principal component analysis of a plurality of normalized face images with sufficient variations.

The pupil unique vector is one whose contribution ratio is higher out of unique vectors obtained by performing a principal component analysis of a plurality of normalized pupil images with sufficient variations.

Face Region Expectation Measure 50

The face region expectation measure 50 is a measure for determining the region (face expectation region) where the face of the object person C is expected to exist from the image (taken image) taken by the cameras 1, based on the profile information input from the profile extraction apparatus 3 and the flesh-color region information and the distance information input from the image analyzer 2.

The face region expectation measure 50 comprises a face region search unit 51.

The face region search unit 51 of the face region expectation measure 50 is a unit for searching the region (face expectation region), where the face of the object person C is expected to exist, out of his/her image obtained by imaging him/her.

Figure 7A:
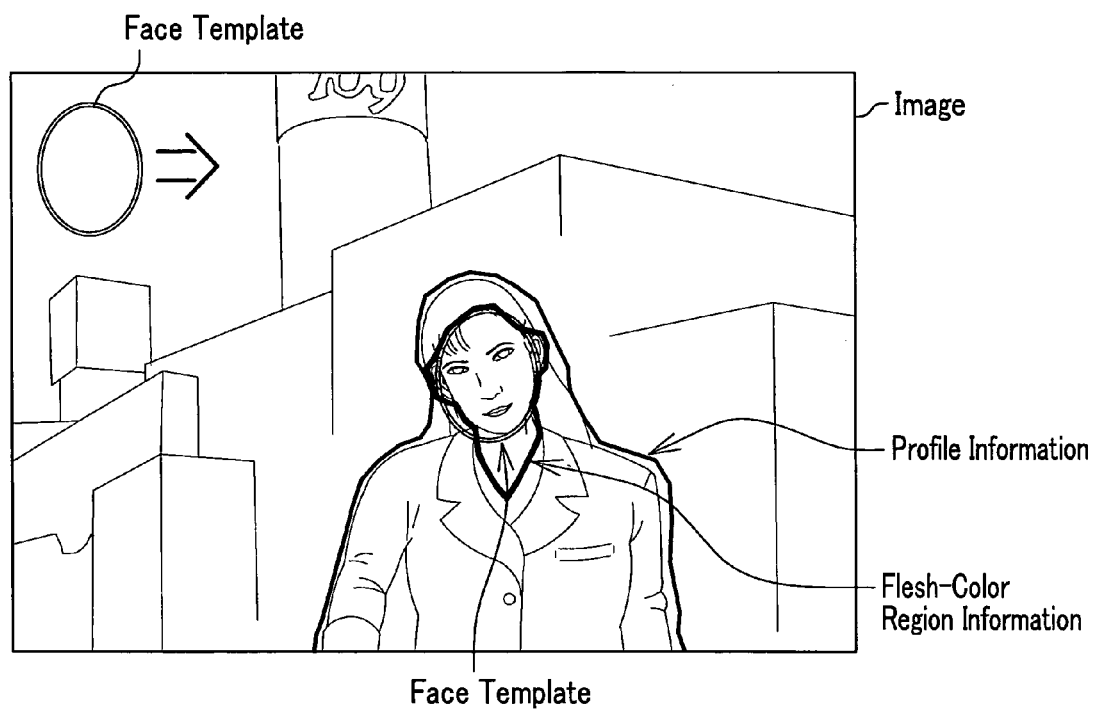
FIG. 7A is a drawing illustrating a method for determining a face expectation region in a standard image generated from an image.

To be more precise, as shown in FIG. 7A, the face region search unit 51 refers to the profile information input from the profile extraction apparatus 3 and checks a region (object person existing region) where the object person C exists within the image. And the unit 51 refers to the flesh-color region information input from the image analyzer 2 and checks a flesh-color region included in the object person C existing region, and sets the checked flesh-color region and a vicinity region thereof as a search region. And the unit 51 scans the search region with an elliptical face template prepared in advance, and makes a flesh-color region, which shows predetermined fitness with the face template, the face expectation region.

The embodiment respectively obtains an area ratio of the flesh-color region included within the ellipse of the face template and an overlap degree between an edge of the face template and that of the flesh-color region (edge fitness), and when the area ratio and/or the edge fitness exceeds a predetermined threshold, determines the flesh-color region where the ellipse of the face template is located as the face expectation region.

And the face region search unit 51 generates data (face expectation region data) showing where the face expectation region exists in the image, refers to pixel values of pixels included in the face expectation region, and generates distance data showing distances between the face expectation region and the cameras 1.

And the face region search unit 51 outputs the face expectation region and the distance data to a standard image generation unit 61 of the pupil candidate point detection measure 60.

Pupil Candidate Point Detection Measure 60

The pupil candidate point detection measure 60 is a measure for detecting a region (left eye candidate point) where the left eye of the object person C is expected to exist and a region (right eye candidate point) where his/her left eye is expected to exist.

The pupil candidate point detection measure 60 comprises the standard image generation unit 61, a pupil search region set unit 62, and a pupil candidate point detection unit 63.

The standard image generation unit 61 is a unit for scaling the image obtained by imaging the object person C and adjusting the image to an image size equal to that (standard image) at a predetermined distance.

To be more precise, the standard image generation unit 61 refers to the distance data input from the face region search unit 51 and obtains distances from the cameras 1 to the face expectation region of the object person C (face of the object person C). And when the predetermined distance is set 1 m, the unit 61 adjusts the size of the image to an image size corresponding to a case of the distances from the cameras 1 to the face expectation region being 1 m and makes it the standard image.

In other words, when the distances from the cameras 1 to the face expectation region of the object person C are 1.5 m, the standard image generation unit 61 expands the size of the image to the image size corresponding to a case of the distances being 1 m; when the distances from the cameras 1 to the face expectation region of the object person C are 0.5 m, the unit 61 shrinks the size of the image to the image size corresponding to the case of the distances being 1 m.

Here the standard image can be generated by multiplying the image by α fold, and α has a relationship expressed in a following formula:

α=(an average of a distance value of pixels within a face expectation region)/a predetermined distance.

Here in a normalization processing unit 73 of a reference data generation measure 70 described later, because normalization processing is performed so that a distance between right/left pupils of the object person C becomes predetermined pixels (for example, N pixels), the embodiment is preferable to make the distance between right/left pupils of the object person C in a standard image a nearly equal number of pixels, that is, the standard image whose size becomes the N pixels.

For example, in a case of a camera whose focus distance and cell size are f mm and C mm/pix, respectively, because a distance L between human being pupils is 65 mm in average, an approximate predetermined distance X where the N pixels becomes 65 mm can be obtained by substituting the above values in a following formula:

$$X = fL/NC = 65f/NC.$$

Accordingly, the predetermined distance is changed according to the focus distance and cell size of the cameras 1.

And the standard image generation unit 61 outputs data (standard image data) showing the generated standard image to the pupil search region set unit 62 and the normalization processing unit 73 of the reference data generation measure 70.

Figure 7B:
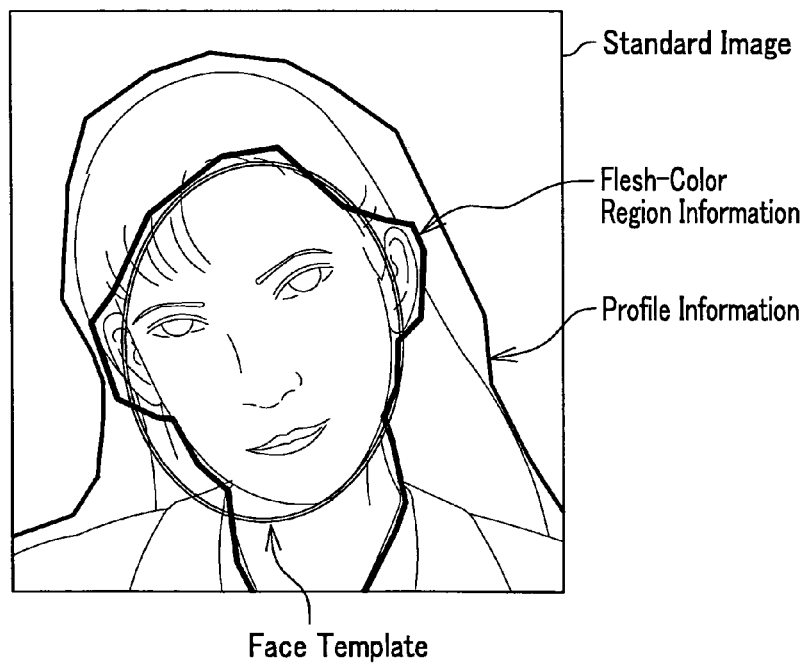
FIG. 7B is an enlarged drawing in a vicinity of a region determined as the face expectation region in the standard image.

Meanwhile, although the embodiment makes it an image itself that is made a same-scale image as that at a predetermined distance by scaling the image, the embodiment may also be designed so as to make it the standard image an image (see FIG. 7B) where a peripheral region including a face expectation region is cut out of the standard image with a predetermined size.

In this case, because an information amount of the standard image can be reduced, a burden can be alleviated in processing at the pupil search region set unit 62, the pupil candidate point detection unit 63, and the reference data generation measure 70 located at subsequent stages of the standard image generation unit 61.

Meanwhile, for a convenience of a description, here as the standard image will be described something (see FIG. 7B) of the periphery of the face expectation region being cut out of the standard image.

The pupil search region set unit 62 is a unit for making a center of gravity G of the face expectation region a standard and setting a region (right eye region R) where the right eye of the object person C is searched and a region (left eye region L) where the left eye of the object person C is searched, respectively, within the standard image.

Figure 8A:
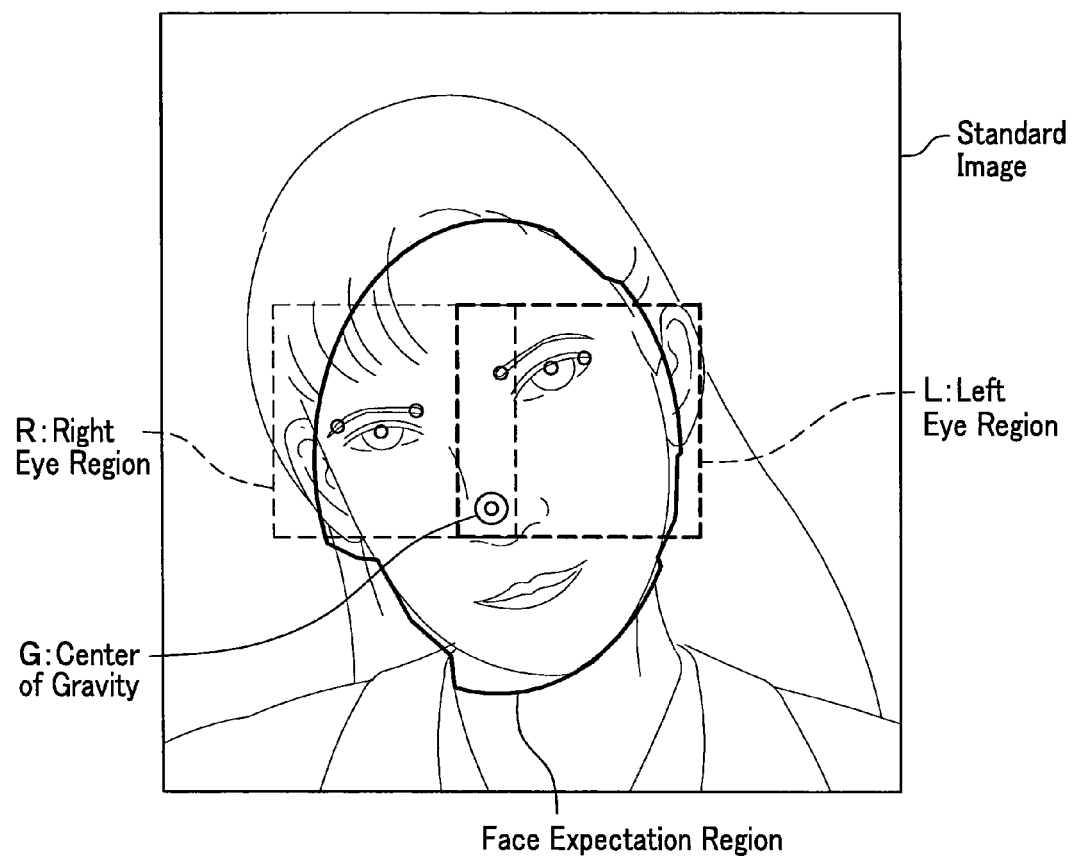
FIG. 8A is a drawing showing a right eye region and a left eye region where a right eye candidate point and a left eye candidate point are searched from within a face expectation region.

To be more precise, as shown in FIG. 8A, the pupil search region set unit 62 obtains the center of gravity G of the face expectation region, referring to the face expectation region data generated at the face region search unit 51, and determines where the center of gravity G is located within the standard image, referring to the standard image data input from the standard image generation unit 61.

And within the standard image, the unit 62 makes the center of gravity G a center and then sets ranges of predetermined sizes such as how many pixels at an upper side, how many pixels at a lower side, how many pixels at a left side, and how many pixels at a right side.

In the embodiment, in order to detect a right eye candidate point and a left eye candidate point, it is designed to set the region (right eye region R) for a right eye candidate point search and the region (left eye region L) for a left eye candidate point search (see FIG. 8A).

Meanwhile, making the center of gravity G a center, each region (right eye region R and left eye region L) is set in such a range whose upper side becomes wider and lower side narrower, and where the center side of the standard image becomes narrower and the both sides of the standard image wider.

A reason why the center of gravity G is thus made the standard is that: when if making it the standard a center in a right/left direction of a detected face expectation region and setting the right eye region R and the left eye region L, the face of the object person C is tilted in the image, the pupils of the object person C might not be included in the set right eye region R and left eye region L.

In addition, because the embodiment uses the flesh-color region information and determines the face expectation region, it cannot correctly detect the flesh-color region due to shade by lighting, and thereby the center of gravity G and a true face center are displaced in some case.

For example, when the face expectation region is determined, including the flesh-color region corresponding to the neck of the object person C, it is thought that the center of gravity G is located at a lower side than the center of gravity G of the face expectation region to be selected in itself, and thereby the pupils and the center of gravity G of the object person C become separate. Consequently, even in such the case in order to allow a right pupil candidate point and a left pupil candidate point to be searched, each region (right eye region R and left eye region L), especially the upper side of the center of gravity G of the standard is made wider.

FIG. 9A is an enlarged drawing of the set right eye region R and left eye region L in a standard image. As obvious from FIG. 9A, within the set right eye region R and left eye region L are depicted regions in the peripheries of the eyes of the object person C by shading of a plurality of pixels.

The pupil candidate point detection unit 63 is a unit for searching a circular edge for each pixel included in the set right eye region R and left eye region L and detecting the pupil candidate points out of pixels that become a predetermined circular edge, that is, the pixels whose circular edge intensity is higher.

To be more precise, the pupil candidate point detection unit 63 scans the right eye region R and the left eye region L through a circular edge filter, respectively, and calculates a roundness value for each pixel included in each region. And from each region the unit 63 detects a pixel whose roundness value is highest and makes it the pupil candidate point. Thus in each region at least one pupil candidate point results in being detected.

Figure 8B:
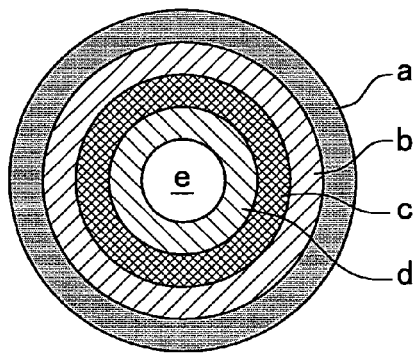
FIG. 8B is a drawing illustrating one aspect of a circular edge filter.

Here as shown in FIG. 8B, the circular edge filter used in the embodiment is configured of a plurality of rings whose radii are different, and the roundness value obtained from a following formula is handled as that of a pixel where the center portion of the circular edge filter is located:

a roundness value=(an average luminance level of a region 1)/(an average luminance level of a region 2).

The roundness value indicates whether or not there is a circle around a pixel, which the circle makes its center, with respect to the pixel where a center portion e of a plurality of rings is located, and the regions 1, 2 in the formula indicates in FIG. 8B, for example, two regions such as (a, b) and (b, c). That the roundness value becomes higher means that the circle exists, that is, the circular edge intensity is higher.

In the embodiment the pupil candidate point detection unit 63 detects top three pixels out of those, whose roundness value is higher, as the pupil candidate points in each region (right eye region R and left eye region L). And the unit 63 gives an identification number to each pupil candidate point detected. In other words, as shown in FIG. 9A, the unit 63 defines in turn the pupil candidate points detected within the right eye region R as right eye candidate points R1, R2, and R3, and within the left eye region L as left eye candidate points L1, L2, and L3.

And for each the pupil candidate point, the unit 63 generates position information showing a position within each region (right eye region R and left eye region L) of the pupil candidate point and pupil candidate point data showing a identification number relevant to the pupil candidate point, and outputs the generated pupil candidate point data to the reference data generation measure 70.

Meanwhile, although the embodiment performs the detection of the pupil candidate point by obtaining the roundness value for each pixel included in the right eye region R and the left eye region L set in the standard image, it may be configured so as to search the pupil candidate point by pattern matching that uses a black circle template.

Reference Data Generation Measure 70

The reference data generation measure 70 is a measure for making it a standard a right pupil candidate point and a left pupil candidate point included in each combination, performing normalization processing of a standard image, and thus generating reference data for all combinations of right pupil candidate points and left pupil candidate points detected.

Here the reference data is data that is used for a face region evaluation performed in a face region evaluation measure 80 located at a subsequent stage of the reference data generation measure 70 and for a judgment of where or not a combination of a selected right pupil candidate point and left pupil candidate point is suitable for identifying the object person C.

The reference data generation measure 70 comprises a pupil pair set unit 71, a pupil pair adjustment unit 72, the normalization processing unit 73, and a reference data generation unit 74.

The pupil pair set unit 71 is a unit for setting the combinations of the right pupil candidate points and left pupil candidate points detected in the pupil candidate point detection unit 63.

To be more precise, the pupil pair set unit 71 refers to pupil candidate data input from the pupil candidate point detection measure 60, checks numbers of the right pupil candidate points and left pupil candidate points, and sets all the combinations of the right pupil candidate points and left pupil candidate points.

Because the embodiment includes, as shown in FIG. 9A, each three of the right pupil candidate points and left pupil candidate points in the right eye region R and the left eye region L, total nine combinations (pairs 1 to 9) shown in FIG. 9B are set.

Consequently, when each number of the right pupil candidate points and the left pupil candidate points is two, four combinations become set in total by the pupil pair set unit 71.

And the pupil pair set unit 71 outputs information of a content shown in FIG. 9B to the pupil pair adjustment unit 72 as the combination information.

The pupil pair adjustment unit 72 is a unit for making it a standard, appropriateness and the like of a geometric arrangement between a right pupil candidate point and a left pupil candidate point out of the combinations (pairs 1 to 9) set by the pupil pair set unit 71 and selecting the pupil candidate points, that is, excluding a pair including the pupil candidate points apparently not corresponding to the pupils.

Figure 10A:
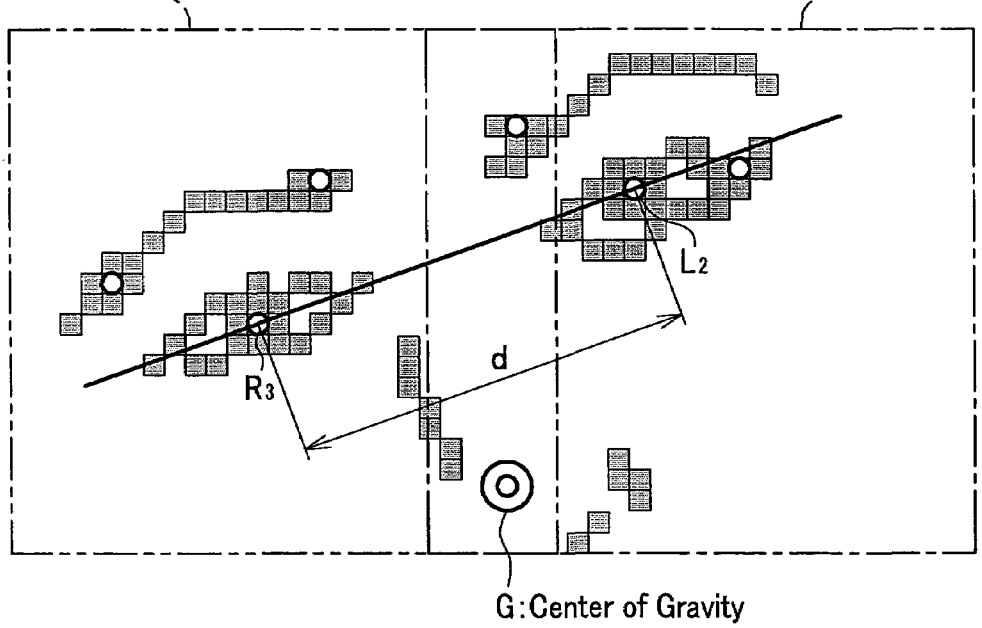
FIG. 10A is a drawing illustrating a method for removing an inadequate pair from within pairs of right pupil eye candidate points and left eye candidate points.

To be more precise, the pupil pair adjustment unit 72 obtains a distance d between a right pupil candidate point and left pupil candidate point of each pair (see FIG. 10A), and if the obtained distance d does not fall within a predetermined range, excludes the pair.

Because in a case of the embodiment a standard image is generated, based on the distance information, the pupil pair adjustment unit 72 can obtain a distance between two points (pixels) included in the standard image. In other words, the distance d between a right pupil candidate point and a left pupil candidate point can be obtained from the position information included in the pupil candidate point data.

Accordingly, when a value of the distance d obtained by calculation does not fall within the predetermined range, it can be judged that at least one of the right pupil candidate point and the left pupil candidate point does not correspond to the pupil.

Meanwhile, the predetermined range used here is arbitrary set, making it a standard an average distance of 65 mm between pupils of a human being.

The following are reasons why a pair including pupil candidate points apparently not corresponding to the pupil is thus excluded in the pupil pair adjustment unit 72:

1) As shown in FIGS. 8A and 9A, because in the searched pupil candidate points (right pupil candidate points R1 to R3 and left pupil candidate points L1 to L3) is included a region not corresponding to the pupil, for example, corresponding to a brow, processing at the normalization processing unit 73 located at the subsequent stage of the pupil pair adjustment unit 72 can be alleviated by excluding a combination that includes pupil candidate points (R1, R2, and/or L1) not corresponding to the pupil;
2) Because the region apparently not corresponding to the pupil can be excluded by the processing in the pupil pair adjustment unit 72, an accuracy of pupil candidate point detection can be improved by increasing a number of pupil candidate points detected from each pupil search region.

Figure 10B:
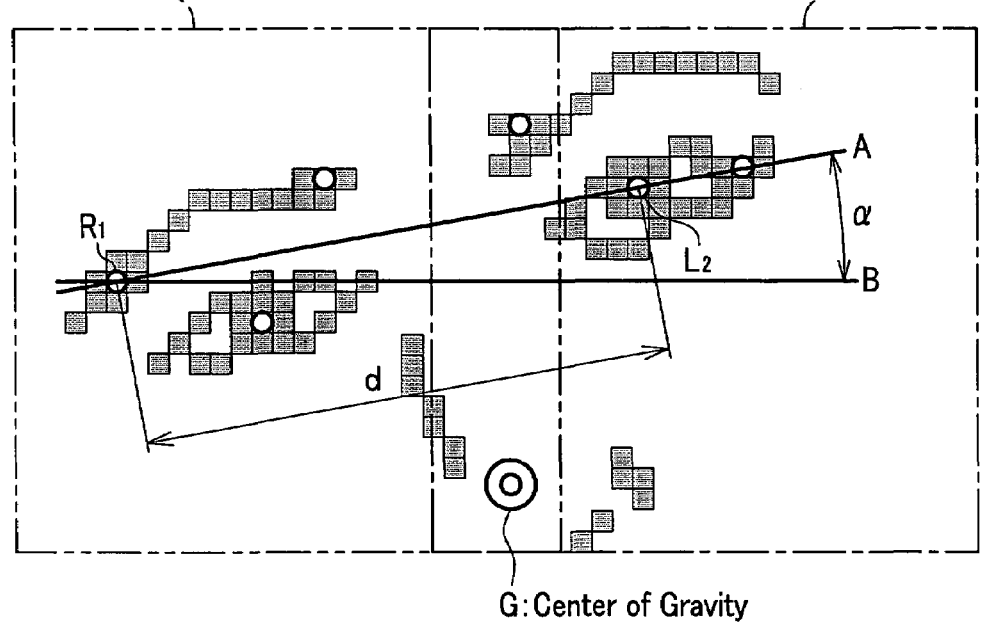
FIG. 10B is a drawing illustrating another method for removing an inadequate pair from within pairs of right pupil eye candidate points and left eye candidate points.

Accordingly, as shown in FIG. 10B, obtaining not only the distance d between a right pupil candidate point and a left pupil candidate point but also an intersection angle α between a line segment A and a line segment B connecting the right pupil candidate point and the left pupil candidate point, the pupil pair adjustment unit 72 can also be configured so as to exclude a pair whose angle α is not less than a predetermined angle.

In this case, considering a case of an object person's face being imaged in a tilted state, it is preferable to set the predetermined angle α around 20 degrees.

Accordingly, in this case a pair whose intersection angle α becomes not less than 20 degrees results in being excluded.

And the pupil pair adjustment unit 72 determines that a pair not excluded is one (normalization object pair) becoming an object of normalization processing, generates information showing which pair is the object of the normalization processing and another information (normalization object information) including data (pupil candidate point data) with respect to pupil candidate points (right pupil candidate point and left pupil candidate point) included in the pair, and outputs these to the normalization processing unit 73.

For example, when out of pairs shown in FIG. 9B the pairs 2, 3, and 9 do not fall within a range set by a threshold, the pupil pair adjustment unit 72 determines the pairs 1, 4, 5, 6, 7, and 8 as the normalization object pair, generates the information showing the pairs determined as the normalization object pair and the normalization object information comprising the pupil candidate point data with respect to pupil candidate points included in the pairs, and output these to the normalization processing unit 73.

Meanwhile, when all the pairs are excluded, the pupil pair adjustment unit 72 outputs pair non-existence information to the face region evaluation measure 80.

The normalization processing unit 73 is a unit for making it a standard pupil candidate points included in normalization object pairs (right pupil candidate points and left pupil candidate points) and generating a normalization face image from a face expectation region in a standard image.

To be more precise, the normalization processing unit 73 refers to the normalization object information output from the pupil pair adjustment unit 72 and checks pairs that become the object of the normalization processing. And for each pair that becomes the object of the normalization processing, the unit 73 makes it a standard a distance between a right pupil candidate point and a left pupil candidate point included in each pair, performs the normalization processing of the face expectation region within the standard image, and makes the normalization face image configured of a region of predetermined pixels (region expressed in M×M pixels).

Figure 11:
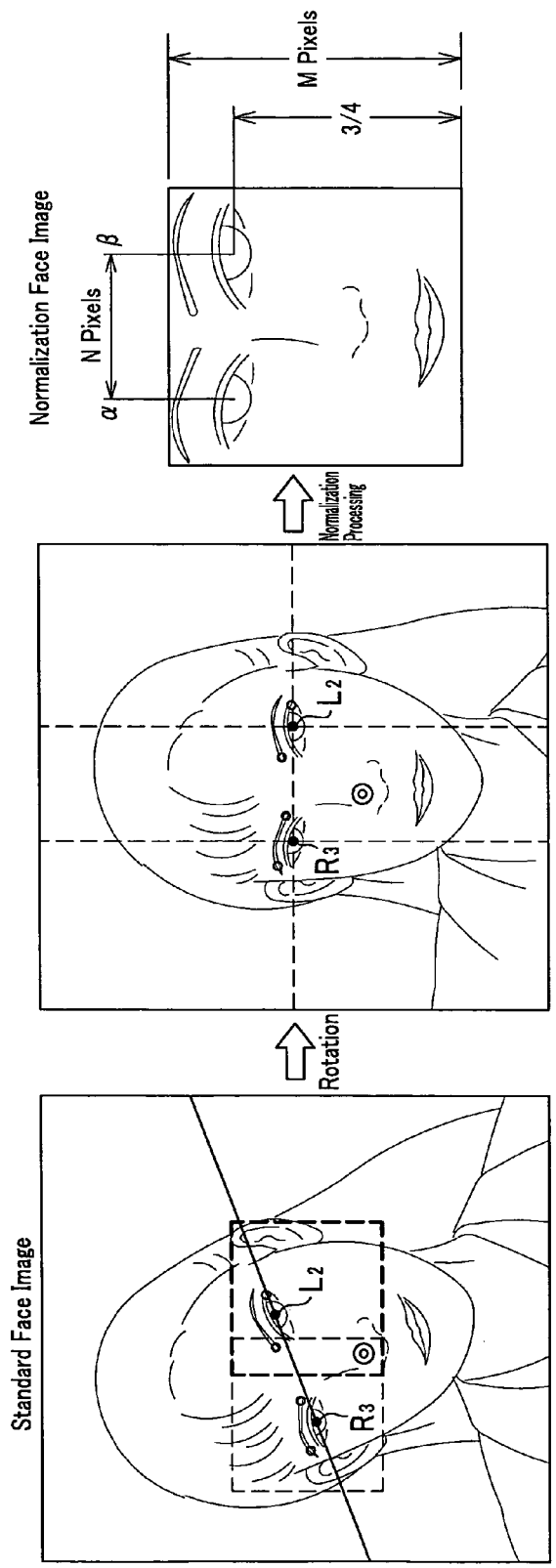
FIG. 11 is a drawing illustrating a procedure till generating a normalization face image from a standard image.

In the embodiment, as shown in FIG. 11, the normalization processing unit 73 rotates a face expectation region expected by the face region expectation measure 50 so that a line segment connecting a center of a right eye candidate point and that of a left eye candidate point becomes horizontal within a standard image. And the unit 73 arranges pupil candidate points (right eye candidate point and left eye candidate point) at three fourths from a bottom in a height direction of predetermined pixels, performs scaling the face expectation region after the rotation so that a distance between the right eye candidate point and the left eye candidate point is expressed in predetermined pixels (N pixels), and thus makes the normalization face image.

Accordingly, when the pairs 1, 4, 5, 6, 7, and 8 are the normalization object pair, six normalization face images result in being made in total by the normalization processing unit 73.

Figure 6:
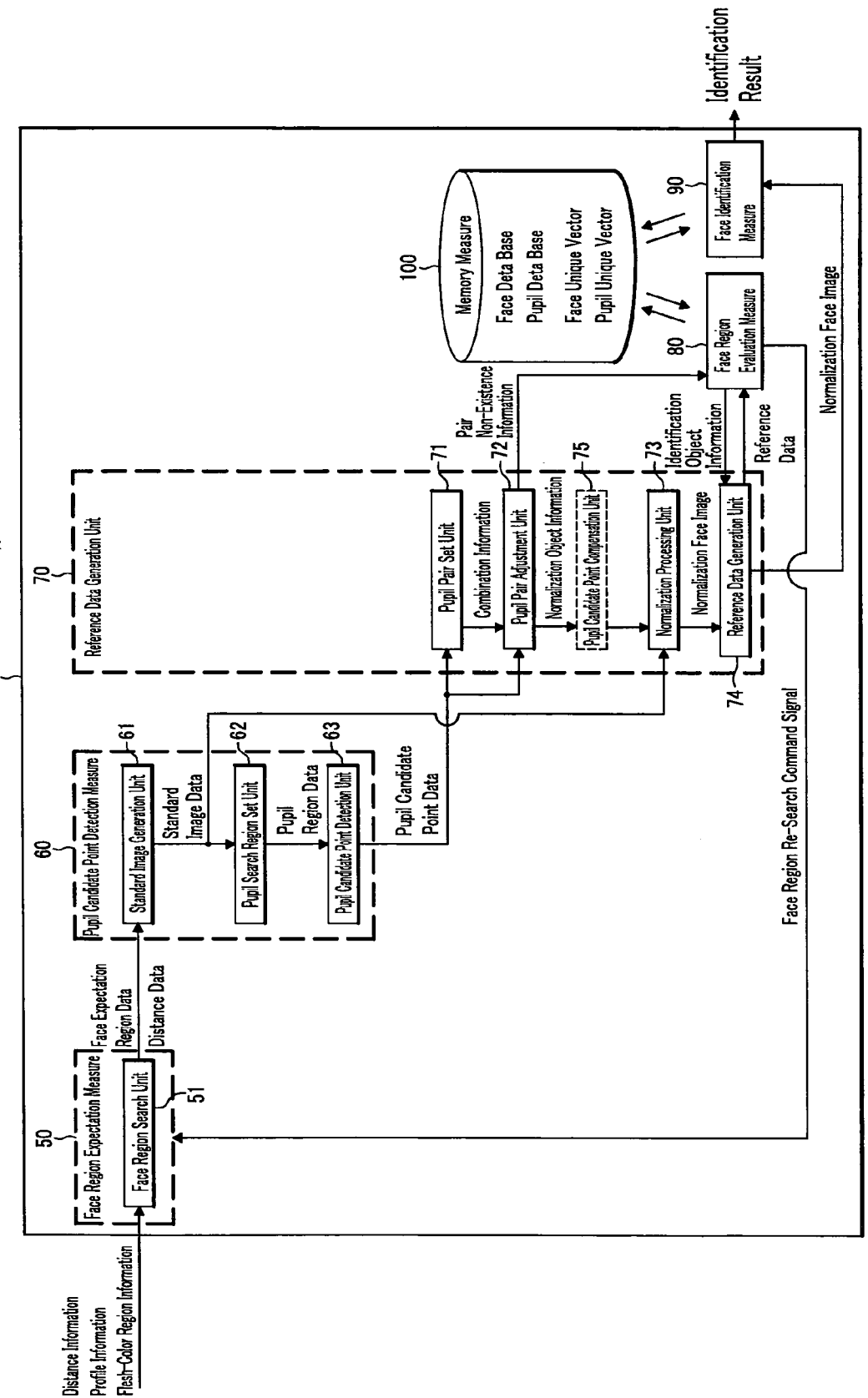
FIG. 6 is a block diagram showing a configuration of a face identification apparatus 4 comprised in the face identification system A shown in FIG. 1.

And the normalization processing unit 73 outputs the normalization face images obtained by the normalization processing to the reference data generation unit 74 (see FIG. 6).

The reference data generation unit 74 is a unit for generating reference data from a normalization face image input from the normalization processing unit 73. Here the reference data is data that is used for a face region evaluation performed by the face region evaluation measure 80 located at a subsequent stage of the reference data generation unit 74 and for a judgment of whether or not a combination of a selected right eye candidate point and left eye candidate point is suitable for identifying the object person C.

Figure 12:
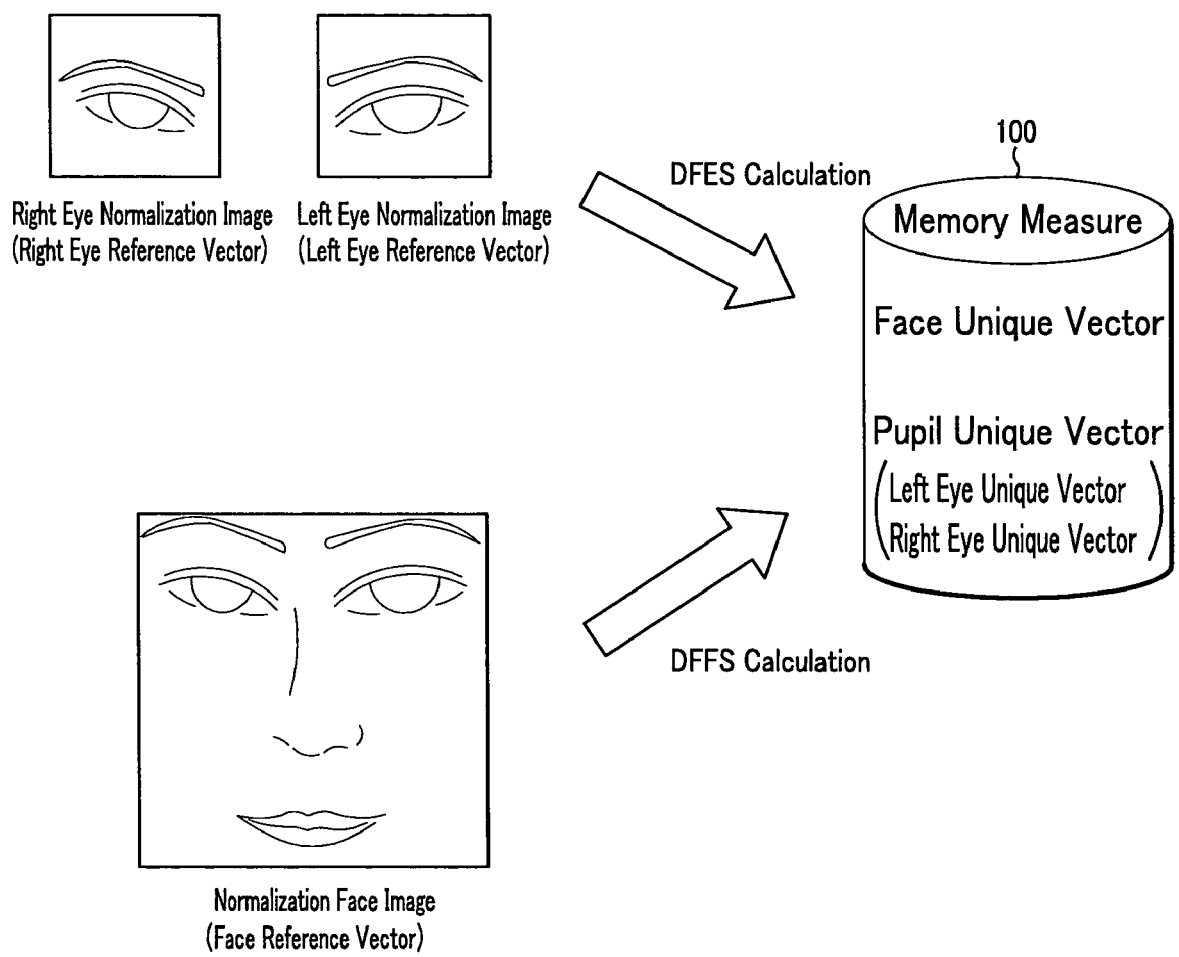
FIG. 12 is a drawing illustrating a case of obtaining a degree of approximation between reference data and standard data generated from a face expectation region.

To be more precise, as shown in FIG. 12, the reference data generation unit 74 is a unit for setting a peripheral region of a right eye candidate point (right eye normalization image) including itself and a peripheral region of a left eye candidate point (left eye normalization image) including itself out of a normalization face image input from the normalization processing unit 73 and expressing a pixel value included in each set region in a vector.

Here assuming that something where the right eye normalization image is expressed in a vector is a right eye reference vector and something where the left eye normalization image is expressed in a vector is a left eye reference vector, the reference data generation unit 74 generates the right eye reference vector, the left eye reference vector, and the reference data comprising information showing from which normalization object pair these vectors are generated, for each normalization object pair, and outputs the generated reference data to the face region evaluation measure 80.

Accordingly, when the pairs 1, 4, 5, 6, 7, and 8 are the normalization pair, six of the reference data are output in total to the face region evaluation measure 80.

Furthermore, the reference data generation unit 74 refers to identification object information input from the face region evaluation measure 80 described later and outputs the normalization face image made for a pair (for example, the pair 8) indicated in the identification object information to a face identification measure 90.

The face region evaluation measure 80 is a unit for judging out of pairs determined as the normalization object pair, based on the reference data output from the reference data generation unit 74:
1) which pair includes a right eye candidate point and a left eye candidate point adequate for representing the right eye and left eye of the object person C; and
2) whether or not a face expectation region searched by the face region search unit 51 of the face region expectation measure 50 is suitable for identifying the face of the object person C.

To be more precise, the face region evaluation measure 80 obtains a distance value Ll of a degree of approximation to a left eye unique vector memorized in a memory measure 100. Furthermore, the unit 80 obtains a distance value Lr of a degree of approximation to a right eye unique vector memorized in the memory measure 100.

Meanwhile, a calculation here is performed by using a so called unique face technique and obtaining a Euclid distance according to a DFES (Difference From Eye Space) calculation.

And the face region evaluation measure 80 obtains the distance value (Ll, Lr) for all normalization object pairs, searches a normalization object pair whose distance value is smallest out of them, and compares the distance value of the normalization object pair, whose distance value smallest, with a predetermined threshold.

For example, reference vectors corresponding to the pairs 1, 4, 5, 6, 7, and 8 has already been input to the face region evaluation measure 80, and if the distance value of the pair 8 indicates the smallest value, the measure 80 compares the distance value of the pair 8 with the predetermined threshold.

And if the distance value is smaller than the predetermined threshold, that is, the degree of approximation is sufficiently high, the face region evaluation measure 80 judges that the pupil candidate points (right pupil candidate point and pupil candidate point) included in the pair 8 are adequate ones for representing the right eye and left eye of the object person C and thus determines that the face expectation region searched by the face region expectation measure 50 is suitable for identifying the object person C.

And the measure 80 outputs the identification object information for indicating the normalization object pair (here, the pair 8) determined as adequate to the reference data generation unit 74.

Receiving this, the reference data generation unit 74 results in outputting the normalization face image generated for the normalization object pair (here, the pair 8) to the face identification measure 90.

On the other hand, if the distance value is larger than the predetermined threshold or the pair non-existence information is input from the pupil pair adjustment unit 72, the face region evaluation measure 80 regards that the face expectation region searched by the face region expectation measure 50 is inadequate for identifying the face of the object person C and outputs a signal (face region re-search command signal) for commanding a re-search of the face expectation region to the face region expectation measure 50.

Thus the face region expectation measure 50 newly determines the face expectation region out of images or from another frame in the images.

Figure 13:
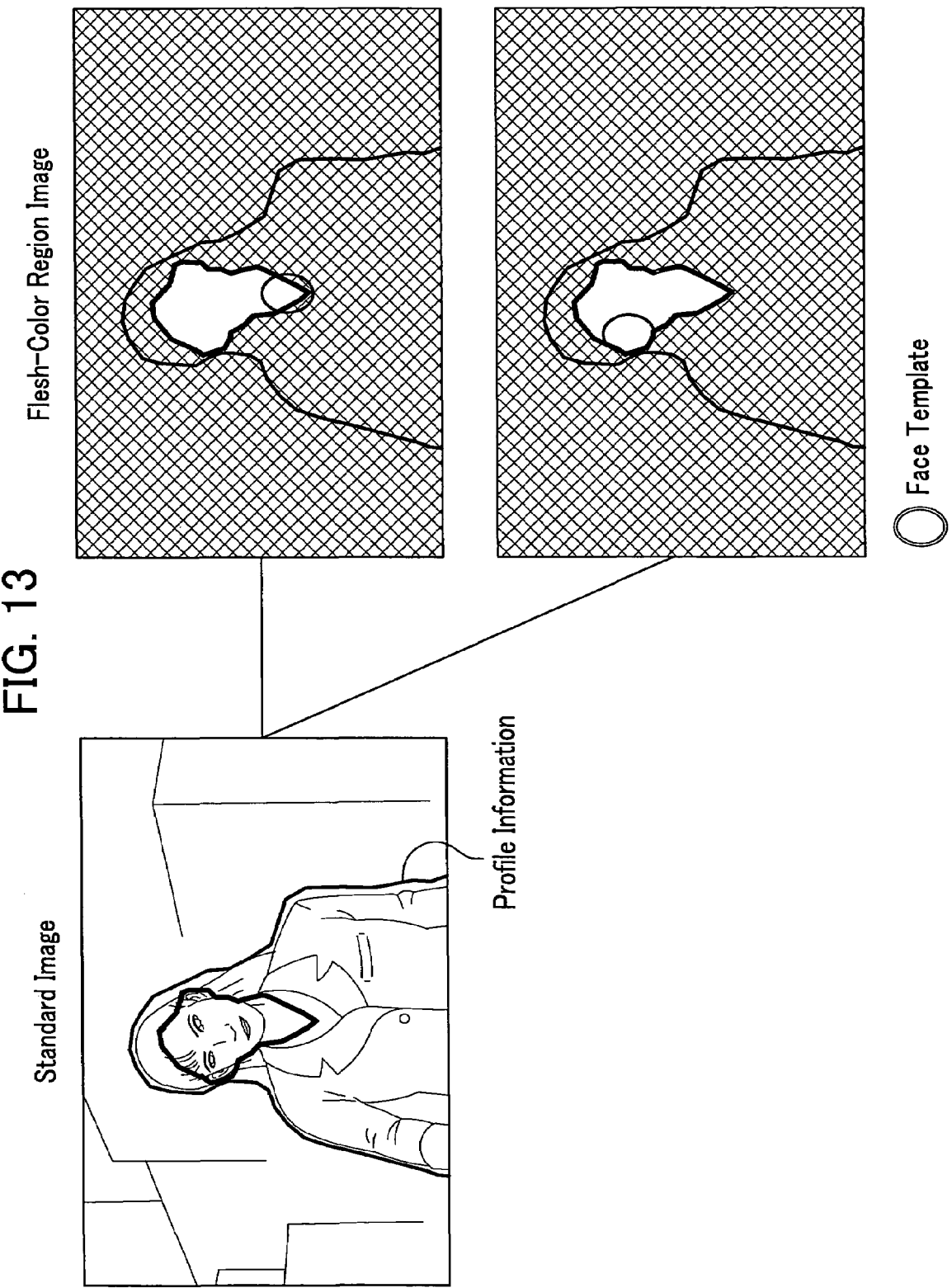
FIG. 13 is a drawing showing an example in a case that an expectation of a face region is missed.

Accordingly, as shown in FIG. 13, in determining a face expectation region by the face region expectation measure 50, because in a case of having determined a region where a face does not exist as the face expectation region, for example, any case of having determined the neck region of the object person C and a region in the vicinity of a forehead as the face expectation region, a distance value between a reference vector obtained from the determined face expectation region and a unique vector space memorized in the memory measure 100 becomes larger, it can become checked that the determined face expectation region is an inadequate one.

Face Identification Measure 90

The face identification measure 90 is a measure for referring to the memory measure 100, based on feature parameters obtained from a normalization face image and searching a person having the feature parameters nearest to the obtained feature parameters out of a group of persons whose feature parameters are registered in the memory measure 100.

To be more precise, the face identification measure 90 obtains the feature parameters expressing the face of the object person C by a feature extraction of the normalization face image input from the reference data generation unit 74 and refers to the memory measure 100, based on the obtained feature parameters. And the measure 90 searches the object person C having the feature parameters nearest to ones obtained by the feature extraction of the normalization face image input from the reference data generation unit 74, out of the group of the persons whose feature parameters are registered in the memory measure 100.

In the embodiment, if a normalization face image input from the reference data generation unit 74 is an image made for the pair 8, the face identification measure 90 obtains the feature parameters of the normalization face image generated by making the pair 8 a standard. And the measure 90 searches the object person C having feature parameters nearest to the obtained ones from within the memory measure 100.

Here in the search of the object person C having the feature parameters nearest to the obtained ones, the face identification measure 90 searches feature parameters, where a difference between the generated feature parameters and those of each person memorized in the memory measure 100 becomes not more than a certain threshold, in the memory measure 100; and face data having the feature parameters satisfying this condition is handled as the face data whose feature parameters match (see FIG. 12).

And if the face data whose feature parameters match exists in the memory measure 100, the face identification measure 90 refers to name information of the face data, identifies who is the object person C, and outputs the identification result.

On the other hand, if the face data whose feature parameters match does not exist, the face identification measure 90 outputs the identification result of the object person C being not registered.

Processing Operation in Face Identification Apparatus

Figure 14:
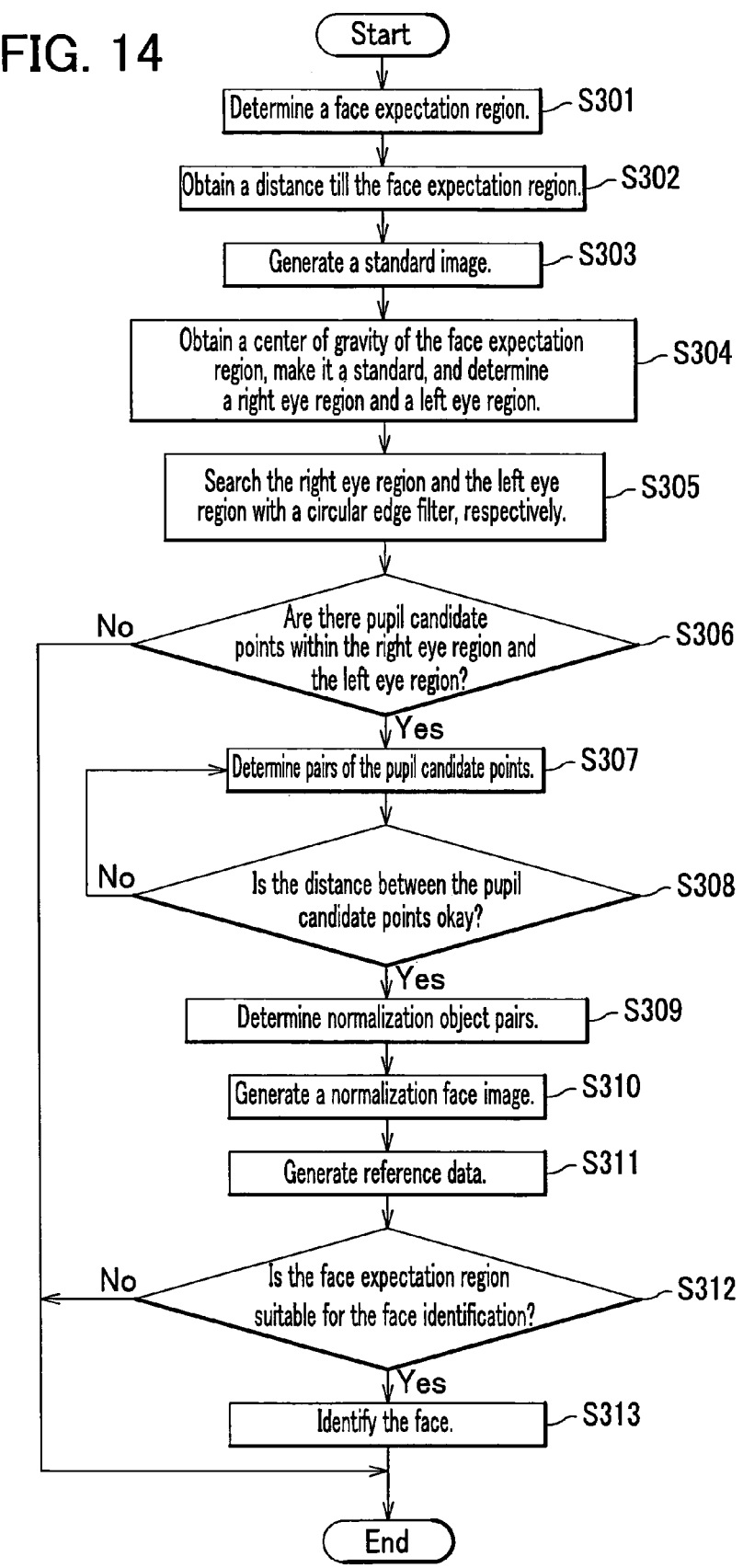
FIG. 14 is a flowchart for illustrating processing in the face identification apparatus 4.

Next will be described processing performed in the face identification apparatus 4 in detail, referring to the block diagram shown in FIG. 1 and a flowchart shown in FIG. 14.

If an image of the object person C is taken by the image analyzer 2 and to the face identification apparatus 4 are respectively input the distance information and the flesh-color region information from the image analyzer 2 and the profile information from the profile extraction apparatus 3, the face region search unit 51 of the face region expectation measure 50 refers to the profile information and the flesh-color region information, sets a flesh-color region and a vicinity region thereof within the image obtained by imaging the object person C as a search region, scans the search region with an elliptical face template prepared in advance, and makes a region indicating predetermined fitness for the face template a face expectation region (step S301).

And the face region search unit 51 generates data (face expectation region data) showing where the face expectation region exists in the image and distance data showing distances between the face expectation region and the cameras 1 with referring to a pixel value of pixels included in the face expectation region (step S302).

Whereat the standard image generation unit 61 of the pupil candidate point detection measure 60 performs scaling the image and adjusts it to an image (standard image) of a size equal to that at a predetermined distance (step S303).

Subsequently, the pupil search region set unit 62 of the pupil candidate point detection measure 60 makes the center of gravity G of the face expectation region a standard and sets regions (right eye region R and left eye region L) for searching the right eye and left eye of the object person C within the standard image (step S304).

Whereat the pupil candidate point detection unit 63 of the pupil candidate point detection measure 60 scans the set right eye region R and left eye region L with a circular edge filter, respectively (step S305), and detects pupil candidate points (right pupil candidate points and left pupil candidate points) out of each of the regions (step S306).

The pupil pair set unit 71 of the reference data generation measure 70 checks a number of the right pupil candidate points and that of the left pupil candidate points detected by the pupil candidate point detection unit 63 and sets all combinations of the right pupil candidate points and the left pupil candidate points (step S307).

Whereat the pupil pair adjustment unit 72 of the reference data generation measure 70 obtains the distance d between the right pupil candidate point and the left pupil candidate point of each combination (pair) for all the combinations set in the step S307 (see FIG. 10B), checks whether or not the obtained distance d falls within a predetermined range (step S308), and excludes pairs that do not fall within the predetermined range and determines pairs not excluded as the normalization object pair (step S309).

The normalization processing unit 73 of the reference data generation measure 70 makes it a standard the pupil candidate points (right eye candidate points and left eye candidate points) included in the normalization object pair and generates a normalization face image from a face expectation region in a standard face image (step S310).

The reference data generation unit 74 of the reference data generation measure 70 sets respective peripheral regions including a right eye normalization image and a left eye normalization image according to the normalization face image input from the normalization processing unit 73, expresses the respective set regions in vectors, makes the respective vectors a right eye reference vector and a left eye reference vector, and generates reference data including theses (step S311).

The face region evaluation measure 80 respectively obtains the right eye reference vector and the left eye reference vector included in the reference data, and the distance Lr of a degree of approximation to the right eye unique vector the distance Ll of a degree of approximation to the left eye unique vector memorized within the memory measure 100.

And the face region evaluation measure 80 judges whether or not the face expectation region is suitable for the face identification, based on the degrees of approximation (step S312).

If the face expectation region is judged suitable for the face identification (Yes), the face identification measure 90 obtains feature parameters from the normalization face image input from the reference data generation unit 74, refers to the memory measure 100, based on the obtained feature parameters, and searches the object person C having feature parameters nearest to ones obtained by the feature extraction of the normalization face image input from the reference data generation unit 74 out of a group of persons whose feature parameters are registered in the memory measure 100; and if there exists face data where the feature parameters satisfy predetermined conditions, the unit 90 refers to the name information of the face data, identifies who is the object person C, and outputs the identification result (step S313).

Operation of Face Identification System A

Next will be described an operation of the face identification system A, referring to the block diagram showing the general configuration of the face identification system A shown in FIG. 1 and a flowchart shown in FIG. 15.

Image Analysis Step

Figure 15:
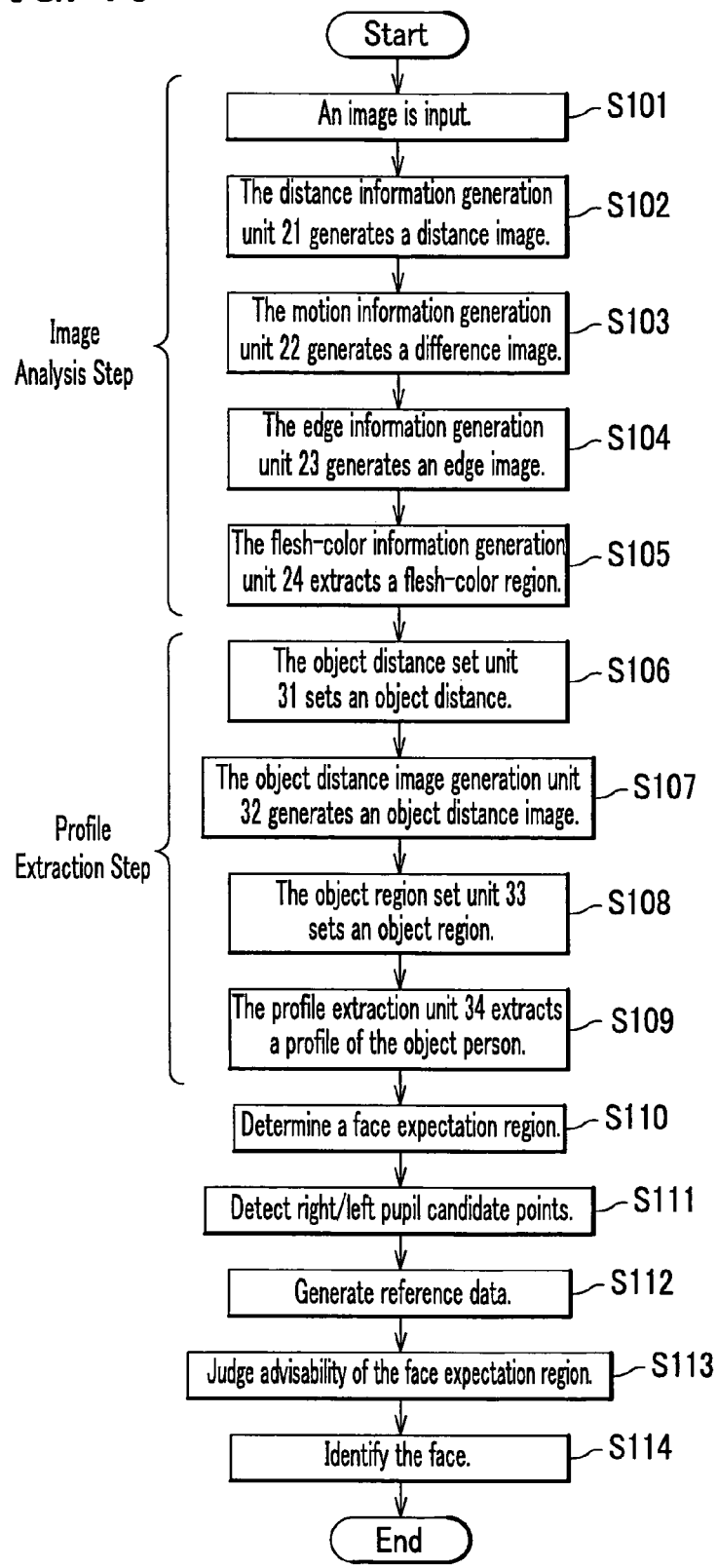
FIG. 15 is a flowchart for illustrating processing in the face recognition system A.

Referring to the flowchart shown in FIG. 15, if in the image analyzer 2 images are input from the cameras 1a, 1b (step S101), the distance information generation unit 21 generates the distance image D1 (see FIG. 3A) of the distance information from the images (step S102), and the motion generation unit 22 generates the difference image D2 (see FIG. 3B) of the motion information from the images (step S103). In addition, the edge information generation unit 23 generates the edge image D3 (see FIG. 3C) of the edge information from the images (step S104), and the flesh-color region information generation unit 24 extracts the flesh-color regions R1, R2 (see FIG. 3D) of the flesh-color region information from the images (step S105).

Profile Extraction Step

Continuously referring to the flowchart shown in FIG. 15, firstly in the profile extraction apparatus 3 the object distance set unit 31 sets an object distance of an object person's existence distance from the distance image D1 and the difference image D2 generated in the steps S102 and S103 (step S106). Subsequently, the object distance image generation unit 32 generates the object distance image D4 (see FIG. 4B) where pixels existing at the object distance set in the step S106 are extracted from the edge image D3 generated in the step S104 (step S107).

Next the object region set unit 33 sets the object region T (see FIG. 5B) within the object distance image D4 generated in the step S107 (step S108). And the profile extraction unit 34 extracts the profile O (see FIG. 5C) of the object person C from within the object region T set in the step S108 (step S109).

Face Region Determination Step

Referring to the flowchart in FIG. 15, the face region expectation measure 50 determines a region (face expectation region) where the face of the object person C may exist within the images, based on the distance information, the flesh-color region information, and the profile information generated in the steps S102, S105, and S109, respectively; and generates distance data showing distances between the face expectation region and the cameras 1 (step S110).

Pupil Candidate Point Detection Step

Subsequently, the pupil candidate point detection measure 60 generates a standard image, based on the distance data generated in the step S110, makes it a standard the center of gravity G of the face expectation region within the standard image, and sets a region for searching the pupils of the object person C within the standard image. And the measure 60 scans the region with a circular edge filter and detects pupil candidate points (right pupil candidate points and left pupil candidate points) (step S111).

Reference Data Generation Step

The reference data generation measure 70 sets all combinations of the right pupil candidate points and the left pupil candidate points included in the pupil candidate points and therein determines a combination (pair) of a right pupil candidate point and a left pupil candidate point, whose distance falls within a predetermined one, as the normalization object pair And the reference data generation measure 70 makes it a standard the pupil candidate points (right pupil candidate points and left pupil candidate points) included in the normalization object pair, generates a normalization face image from the face expectation region in the standard face image, and out of these generates reference data used for an evaluation in a step S113 of a subsequent stage (step S112).

Face Region Evaluation Step

Subsequently, the face region evaluation measure 80 judges whether or not the face region determined by the face region expectation measure 50 is suitable for the face identification of the object person C, based on the reference data (step S113).

Face Identification Step

Lastly, if the face region determined in the step S113 by the face region expectation measure 50 is suitable for the face identification of the object person C, the face identification measure 90 obtains the feature parameters from the normalization face image generated in the step S112, searches the feature parameters nearest to those of the normalization face image out of those memorized in the memory measure 100, and identifies the face of the object person C taken through the cameras 1 (step S114).

Compensation of Pupil Candidate Point

In the embodiment described before the pupil candidate point detection unit 63 scans the right eye region R and the left eye region L with a circular edge filter, respectively, calculates a roundness degree for each pixel included in each region, and makes a pixel, whose roundness degree is highest, a pupil candidate point.

Here in order to improve an accuracy of positions of pupil candidate points, the pupil candidate point detection unit 63 can also be configured so as to further comprise a pupil candidate point compensation unit 75 for checking the normalization object pair judged as suitable for the face identification of the object person C and compensating the positions of the pupil candidate points (right pupil candidate points and left pupil candidate points) included in the normalization object pair.

The pupil candidate point compensation unit 75 makes pixels around a right pupil candidate point and a left pupil candidate point a standard, respectively, and newly obtains a right eye reference vector and a left eye reference vector. And the unit 75 obtains degrees of approximation between the right/left eye reference vectors and right/left eye unique vectors, and if there is a pixel, whose degree of approximation is higher, in the vicinity of the right pupil candidate point and the left pupil candidate point, the unit 75 changes the pupil candidate points with the pixel.

Figure 16:
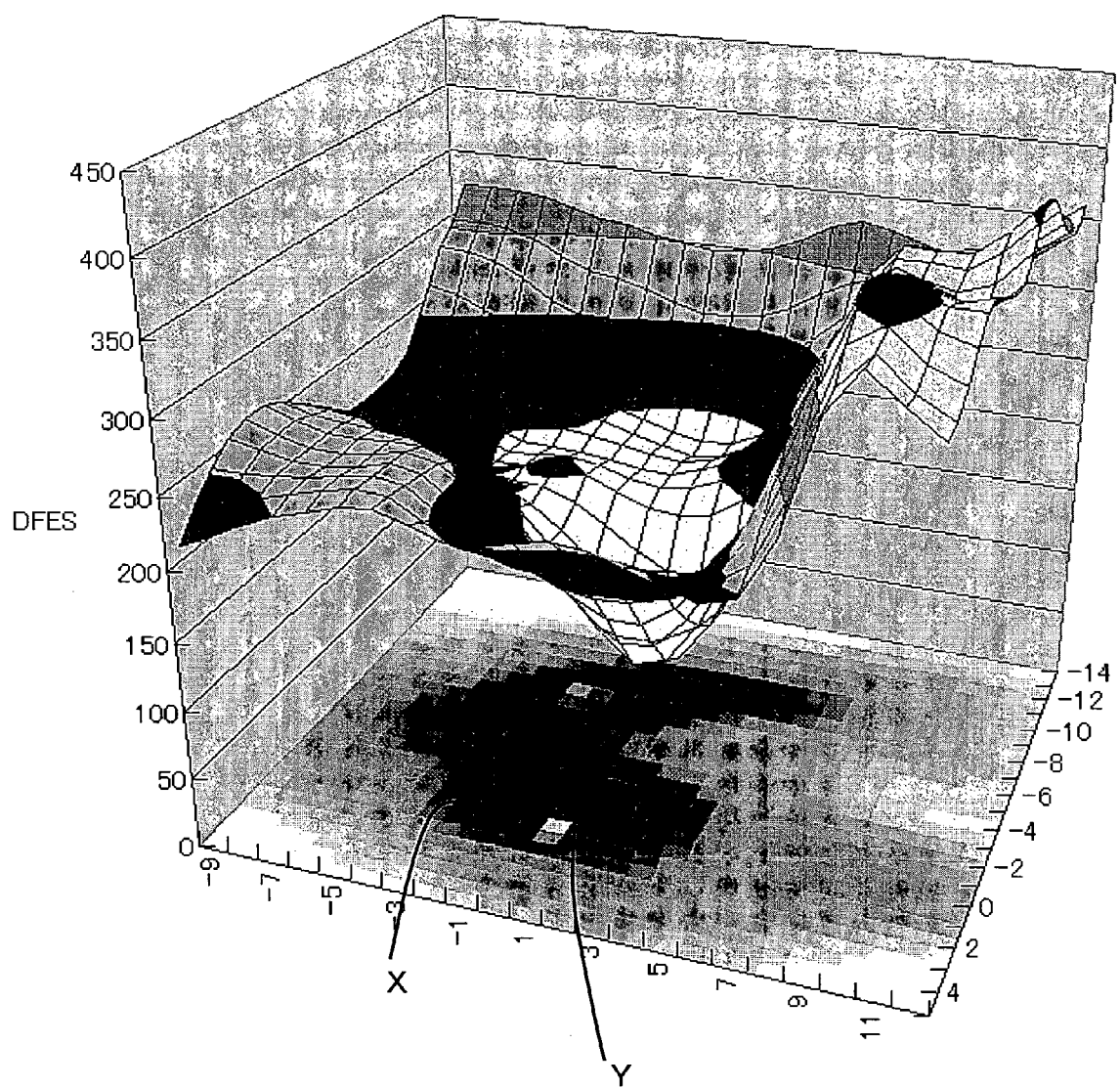
FIG. 16 is a drawing schematically showing a result of an approximation calculation performed in compensating a pupil candidate point.

To be described more precisely, referring to FIG. 16, something transferred at a bottom surface of a graph in FIG. 16 is an image including a left eye and a brow, and a curved surface thereupon is a degree of approximation (DFES value) in each pixel. FIG. 16 shows that the nearer a distance between the curved surface and the bottom surface, the higher the degree of approximation.

For example, even if a pixel X in FIG. 16 is searched as a pupil candidate point at first, the pupil candidate point compensation unit 75 obtains the degree of approximation (DFES value) for peripheral pixels of the pixel X according to the above procedures, and if a pixel Y indicates a higher degree of approximation, the unit 75 judges the pixel Y more adequate as a pupil candidate point and changes the pupil candidate point with the pixel Y.

Thus if the normalization processing unit 73 again generates a normalization face image and the face identification measure 90 identifies the object person C, based on the normalization face image, he/she can become more accurately identified.

Another Aspect of Processing in Reference Data Generation Unit 74

As described before, in the embodiment the reference data generation unit 74 is configured so as to set the right eye normalization image and the left eye normalization image in the normalization face image input from the normalization processing unit 73 and to express each region in a vector (right eye reference vector and left eye reference vector).

However the reference data generation unit 74 can also be configured so as to generate not the right eye reference vector and the left eye reference vector but a face reference vector expressing a whole of the normalization face image in a vector.

In this case the face region evaluation measure 80 obtains a distance value between the face reference vector and a face unique vector of the memory measure 100, that is, obtains a Euclid distance by DFFS (Difference From Face Space) calculation and can judge whether or not a face expectation region determined by the face region expectation measure 50 according to the procedures described before is suitable for the face identification of the object person C (see FIG. 12).

Compensation of Face Expectation Region

Here if the face region evaluation measure 80 judges that a region (face expectation region) where the face of the object person C is expected to exist is adequate for a face region of the object person, the measure 80 can also be configured so as to make it a standard a right eye candidate point and a left eye candidate point detected by the pupil candidate point detection measure 60 and to again expect the face expectation region, that is, compensate it.

To be more precise, when scanning a search region set in an image with an elliptical face template in order to search the face of the object person C, the face region evaluation measure 80 matches positions corresponding to eyes within the face template with those of pupil candidate points, that is, makes a right eye candidate point and a left eye candidate point a standard and again sets (compensates) the face expectation region.

Thus, because the compensated face expectation region (after-compensation face expectation region) indicates a region where the face of the object person C more accurately exists than at the face expectation region expected at first, the region can become determined where the face of the object person C more accurately exists.

Thus, although the preferred embodiments of the present invention are described, the invention is not limited thereto. For example, although the embodiments are described as a face identification system, it can also be thought as a program describing processing of each configuration of the face identification system with a multipurpose computer language.

In addition, a face identification apparatus related to the present invention can favorably perform a face identification of an object person even in a situation that a positional relationship between a light source and him/her changes and an extraction of a face region does not always succeed like cases of his/her moving and his/her image being taken while moving, because the apparatus performs the extraction of the face region upon evaluating whether or not the face region is suitable for the face identification.

Accordingly, the face identification apparatus is also applicable to various moving bodies such as a legged walking robot and an automobile.

What is claimed is:

1. A face identification apparatus comprising:
   a face identification measure for identifying a face of an object person, based on an image of said object person taken by a camera;
   a face region expectation measure for expecting a face region of said object person in said image, based on distance information representing a distance from said camera to said object person, and profile information and flesh-color region information of said object person generated from said image;
   a pupil-candidate-point detection measure for generating a standard image with converting said face region to an image of a standard size, based on said distance information, setting a search region with making it a standard a center of gravity of said face region in the standard image, searching a circular edge for each pixel included in the search region, and detecting a right pupil candidate point and left pupil candidate point of said object person out of pixels of a predetermined circular edge;
   a reference data generation measure for rotating said standard image so that a line segment connecting said right pupil candidate point and said left pupil candidate point becomes horizontal within said standard image, then generating a normalization image with making it a standard a distance of said right pupil candidate point and said left pupil candidate point, and making reference data for evaluating advisability of said face region from the normalization image; and
   a face region evaluation measure for obtaining a degree of approximation between said reference data and standard data prepared in advance and evaluating the advisability of said face region, based on the obtained degree of approximation.

2. A face identification apparatus according to claim 1, wherein said pupil candidate point detection measure detects at least not less than each one of said right eye candidate point and said left eye candidate point, and said reference data generation measure generates said reference data for all combinations of said right eye candidate point and said left eye candidate point detected.

3. A face identification apparatus according to claim 2, wherein if said face region is judged inadequate by said face region evaluation measure, said face region evaluation measure requests said face region expectation to again expecting a face region of said object person.

4. A face identification apparatus according to claim 2, wherein if said face region is judged adequate by said face region evaluation measure, said face region evaluation measure makes said right eye candidate point and said left eye candidate point a standard and compensates said face region.

5. A face identification apparatus according to claim 1, wherein if said face region is judged inadequate by said face region evaluation measure, said face region evaluation measure requests said face region expectation to again expecting a face region of said object person.

6. A face identification apparatus according to claim 5, wherein if said face region is judged adequate by said face region evaluation measure, said face region evaluation measure makes said right eye candidate point and said left eye candidate point a standard and compensates said face region.

7. A face identification apparatus according to claim 1, wherein if said face region is judged adequate by said face region evaluation measure, said face region evaluation measure makes said right eye candidate point and said left eye candidate point a standard and compensates said face region.

8. A method for identifying a face of an object person, based on an image of said object person taken by a camera, the method comprising:
   a face region expectation step of expecting the face region of said object person in said image, based on distance information representing a distance from said camera to said object person, profile information and flesh-color-region information of said object person generated from said image;
   a pupil-candidate-point detection step of generating a standard image with converting said face region to an image of a standard size, based on said distance information, setting a search region with making it a standard a center of gravity of said face region in the standard image, searching a circular edge for each pixel included in the search region, and detecting a right pupil candidate point and left pupil candidate point of said object person out of pixels of a predetermined circular edge;
   a reference data generation step of rotating said standard image so that a line segment connecting said right pupil candidate point and said left pupil candidate point becomes horizontal within said standard image, then generating a normalization image with making it a standard a distance of said right pupil candidate point and said left pupil candidate point, and making reference data for evaluating advisability of said face region from the normalization image;
   a face region evaluation step of obtaining a degree of approximation between said reference data and standard data prepared in advance and evaluating the advisability of said face region, based on the obtained degree of approximation;
   a face data making step of making face data of said object person from said normalization image if said face region is judged adequate in said face region evaluation step; and
   a face identification step of comparing and collating the face data made in said face data making step with face data registered in a memory measure.

9. A face identification program, wherein in order to identify a face of an object person, based on an image of said object person taken by a camera, a computer is made to function as:
   a face region expectation measure for expecting a face region of said object person in said image, based on distance information representing a distance from said camera to said object person, and profile information of and flesh-color-region information of said object person generated from said image;

a pupil-candidate-point detection measure for generating a standard image with converting said face region to an image of a standard size, based on said distance information, setting a search region with making it a standard a center of gravity of said face region in the standard image, searching a circular edge for each pixel included in the search region, and detecting a right pupil candidate point and left pupil candidate point of said object person out of pixels of a predetermined circular edge;

a reference data generation measure for rotating said standard image so that a line segment connecting said right pupil candidate point and said left pupil candidate point becomes horizontal within said standard image, then generating a normalization image with making it a standard a distance of said right pupil candidate point and said left pupil candidate point, and making reference data for evaluating advisability of said face region from the normalization image;

a face region evaluation measure for obtaining a degree of approximation between said reference data and standard data prepared in advance and expecting the advisability of said face region, based on the obtained degree of approximation;

a face data making step of making face data of said object person from said normalization image if said face region is judged adequate in said face region evaluation step; and a face identification measure for comparing and collating the face data made in said face data making measure with face data registered in a memory measure.

* * * * *